Dec. 26, 1939.  E. M. ALLEN ET AL  2,184,787
INTERLOCKING CONTROL APPARATUS
Filed Oct. 26, 1933  8 Sheets-Sheet 1
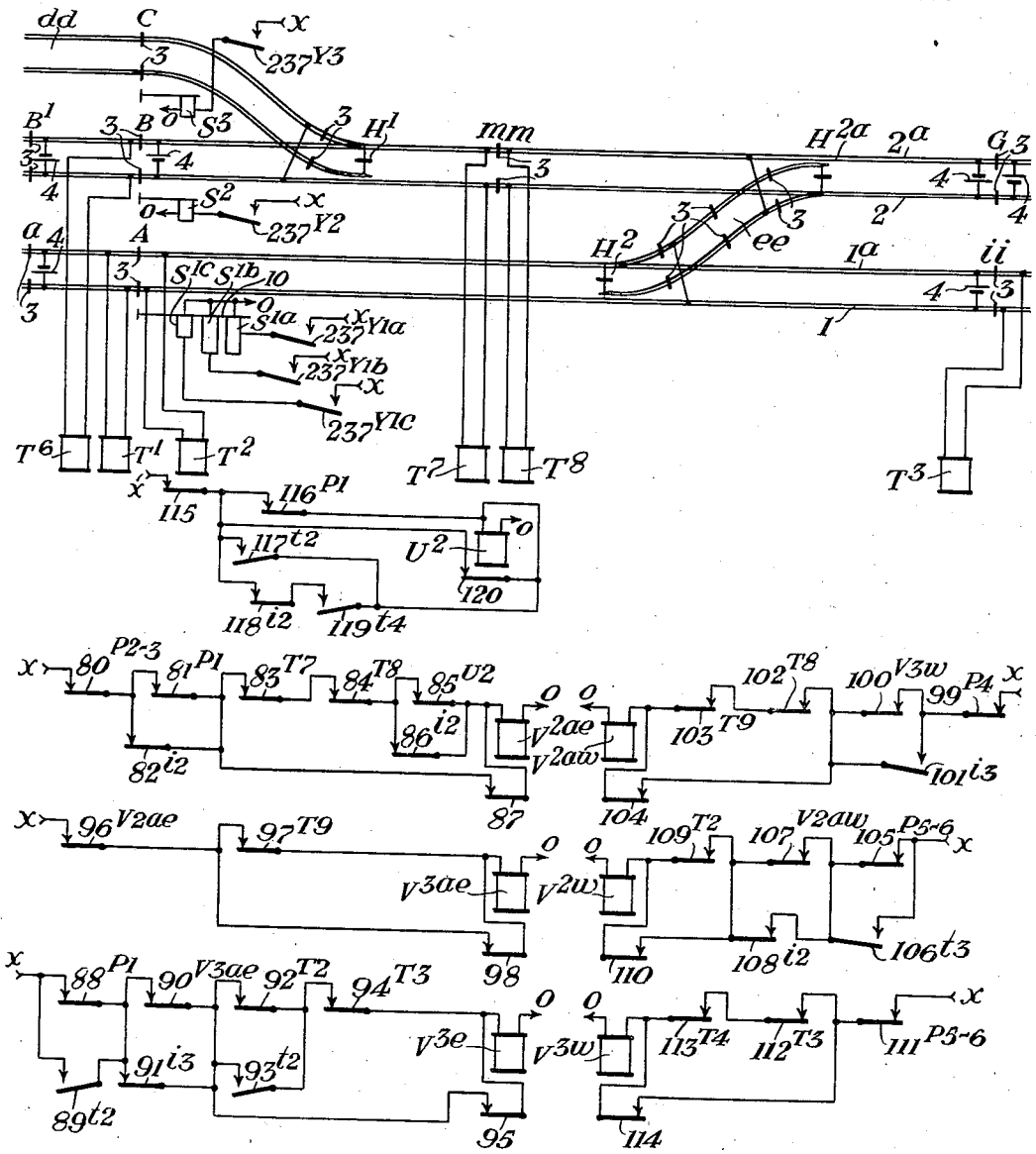
Fig.1ª
INVENTORS
Earl M. Allen and
BY Howard A. Thompson
THEIR ATTORNEY Dec. 26, 1939.  E. M. ALLEN ET AL  2,184,787
INTERLOCKING CONTROL APPARATUS
Filed Oct. 26, 1933   8 Sheets-Sheet 2
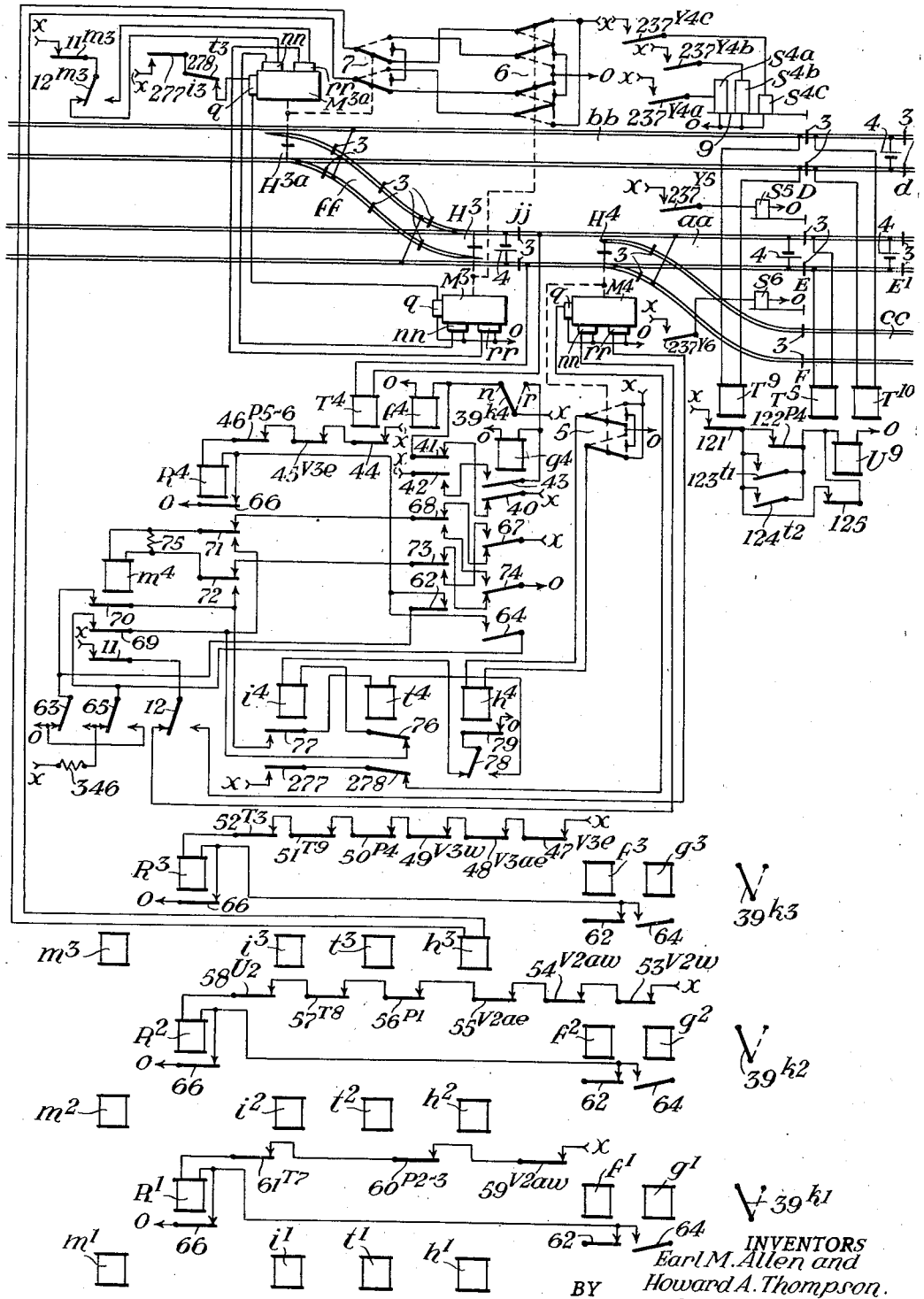
Fig. 1ᵇ
INVENTORS
Earl M. Allen and
Howard A. Thompson.
BY
THEIR ATTORNEY

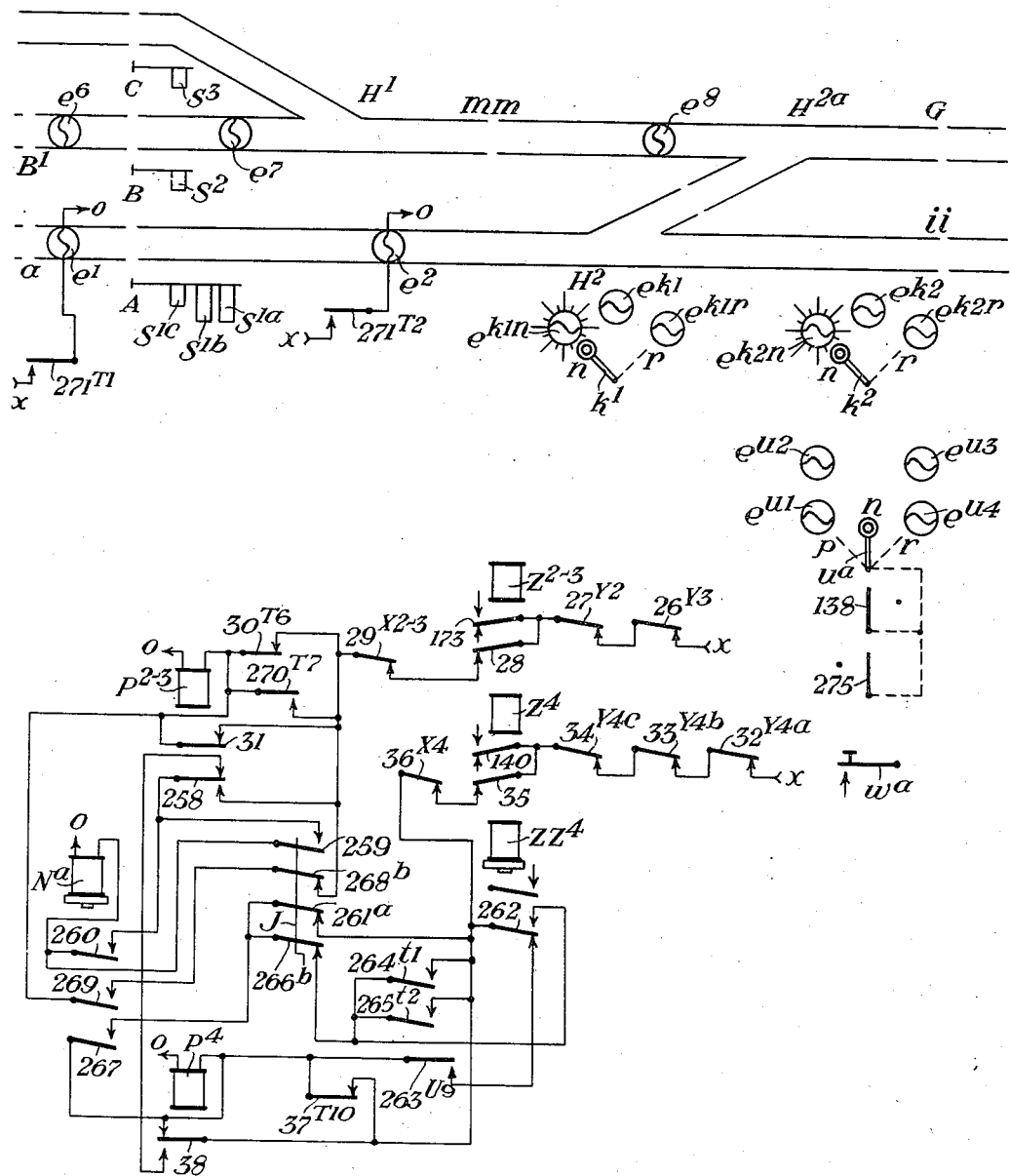
Fig. 2ᵃ

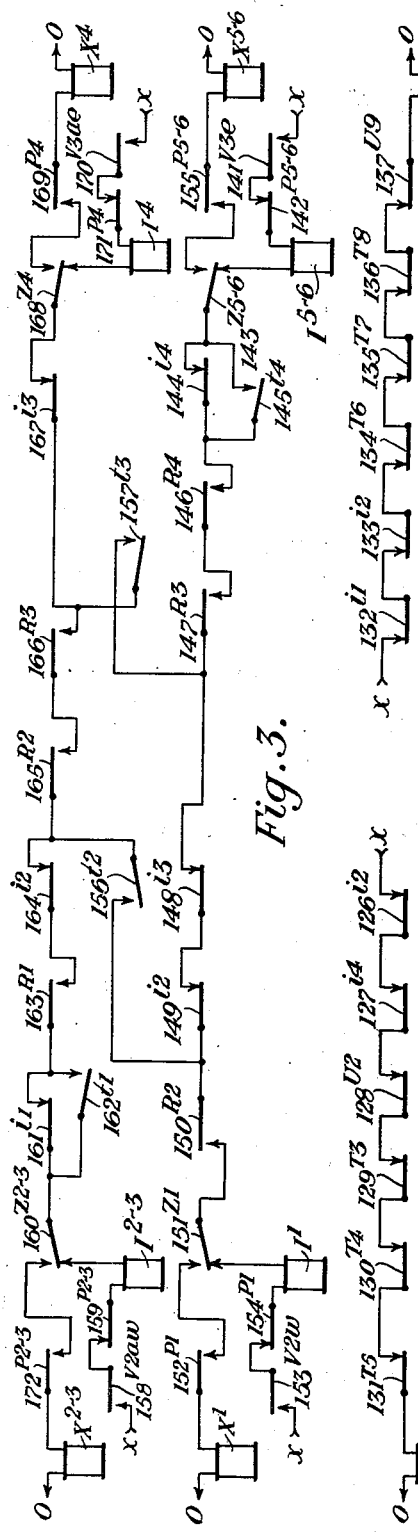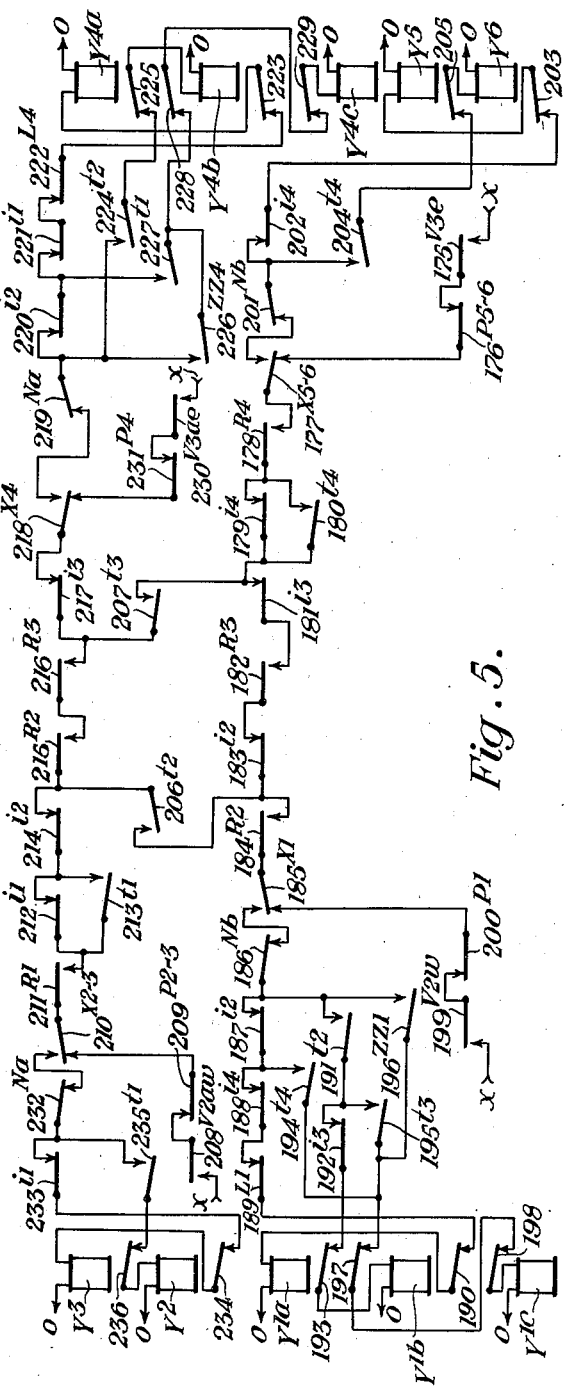

Patented Dec. 26, 1939

2,184,787

UNITED STATES PATENT OFFICE 2,184,787

INTERLOCKING CONTROL APPARATUS

Earl M. Allen, Swissvale, and Howard A. Thompson, Edgewood, Pa., assignors to The Union Switch & Signal Company, Swissvale, Pa., a corporation of Pennsylvania Application October 26, 1933, Serial No. 695,294

63 Claims. (Cl. 246—134)

Our invention relates to interlocking control apparatus, and is particularly adapted for, though not limited to, the control of railway track switches and signals in a railway switching or interlocking layout.

One feature of our invention is the provision of novel and improved interlocking control apparatus without the use of interlocked levers. Another feature of our invention is the provision of novel and improved indication apparatus associated with such interlocking control apparatus.

The apparatus of our invention is an improvement over that disclosed in the copending applications Serial No. 323,286, filed December 3, 1928, by Lester E. Spray for Multiple control apparatus; and Serial No. 416,061, filed December 23, 1929, by Howard A. Thompson for Multiple control apparatus.

We will describe three forms of apparatus embodying our invention, and will then point out the novel features thereof in claims.

Figure 6:
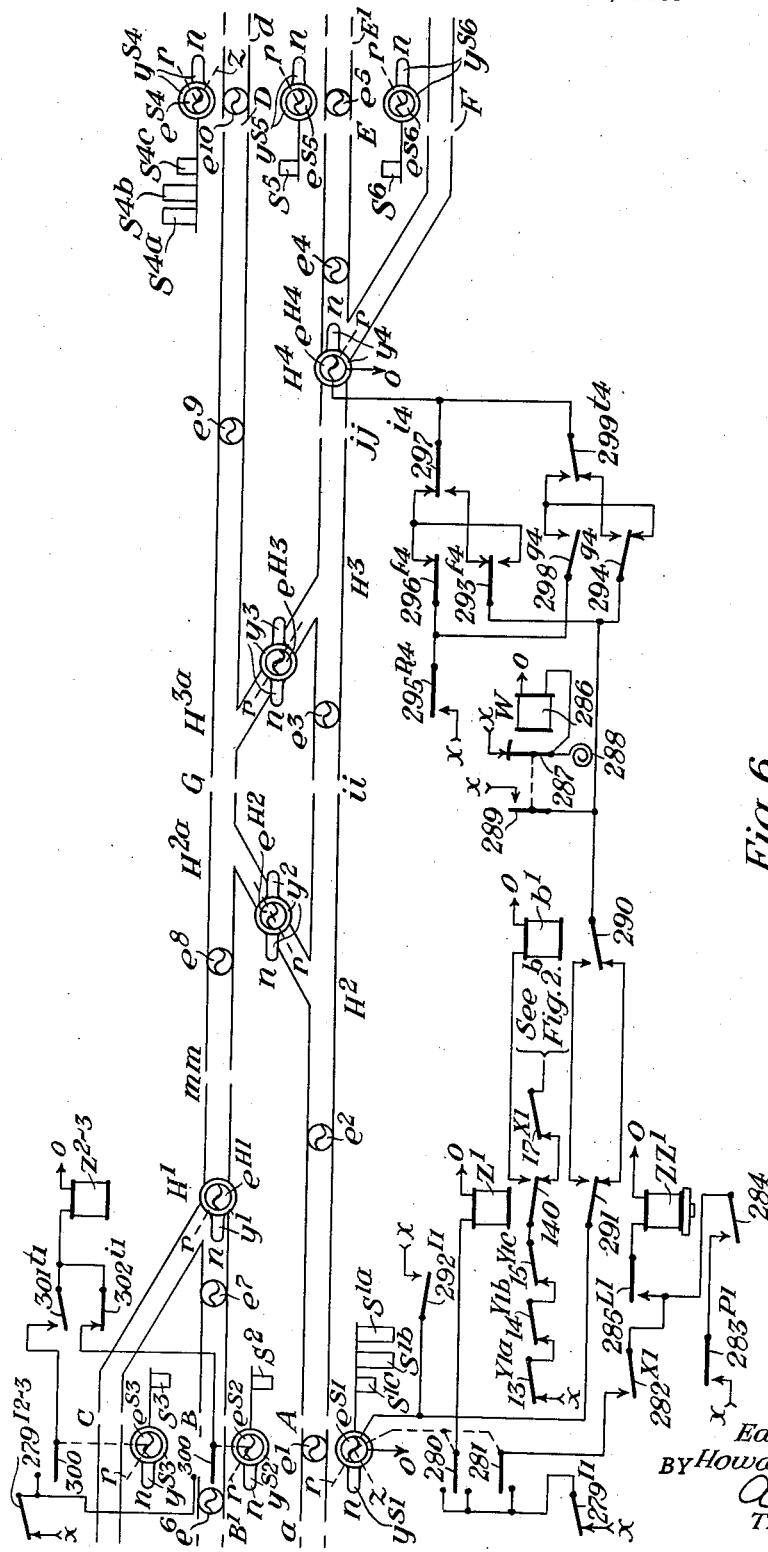

In the accompanying drawings, Figs. 1$^a$ to 5, inclusive, are diagrammatic views showing the component parts of one form of apparatus embodying our invention. More specifically, Figs. 1$^a$ and 1$^b$ show a typical track, switch, and signal layout, as well as switch control and indication circuits for apparatus embodying our invention; Figs. 2$^a$ and 2$^b$ show a track model, and switch and signal control levers, together with approach locking circuits and call-on signal control circuits for the layout shown in Figs. 1$^a$ and 1$^b$; Fig. 3 shows signal control circuits interconnected to form what we will refer to hereinafter as a route check network; Fig. 4 shows circuits for controlling signal slotting relays; and Fig. 5 shows interconnected circuits constituting a signal control relay network. Fig. 6 is a diagrammatic view showing a modification of a part of the apparatus shown in Figs. 2$^a$ and 2$^b$, and also embodying a part of our invention. Figs. 7$^a$ and 7$^b$ are diagrammatic views showing a modification of a part of the apparatus shown in Fig. 6, and also embodying a part of our invention.

Similar reference characters refer to similar parts in each of the views.

Referring first to Figs. 1$^a$ and 1$^b$, these drawings show a stretch of double track railway, tracks $aa$ and $bb$ of which are interconnected through a crossover $ee$ with which they are respectively joined by switches $H^2$ and $H^{2a}$, and are likewise interconnected by a second crossover $ff$ with which they are respectively joined by switches $H^3$ and $H^{3a}$. Tracks $aa$ and $bb$ are also respectively joined to passing sidings $cc$ and $dd$ by switches $H^4$ and $H^1$. The reference characters 1 and 1$^a$ designate the rails of track $aa$, and the reference characters 2 and 2$^a$ designate the rails of track $bb$.

These rails are divided by insulated joints 3 to form a plurality of track sections $a$—A, A—$ii$, $ii$—$jj$, $jj$—E, E—E$^1$, B$^1$—B, B—$mm$, $mm$—G, G—D and D—$d$. Each of these track sections is supplied with current by a battery 4 connected across the rails adjacent one end of the section. A track relay, designated by the reference character T with a distinguishing exponent, is connected across the rails adjacent the opposite end of each track section.

Reference character S, with distinguishing exponents, designates signals which are placed adjacent the points A, B, C, D, E and F, respectively, and which, as here shown, are of the semaphore type. Signals $S^{1a}$, $S^{1b}$ and $S^{1c}$ are mounted on a common mast 10, and signals $S^{4a}$, $S^{4b}$ and $S^{4c}$ are mounted on a common mast 9. Signals $S^{1a}$, $S^{1b}$, $S^{1c}$, $S^2$ and $S^3$ govern eastbound traffic moves, that is moves which are made over the stretch of track from left to right as shown in the drawings, and signals $S^{4a}$, $S^{4b}$, $S^{4c}$, $S^5$ and $S^6$ govern westbound traffic moves, that is, moves which are made over the stretch of track from right to left as shown in the drawings.

Each track section in which a switch is located will be referred to hereinafter as a detector section. Track sections $a$—A and D—$d$ in the rear of signals $S^1$ and $S^4$, respectively, and track sections B$^1$—B and E—E$^1$ in the rear of signals $S^2$ and $S^5$, respectively, will be referred to as approach track sections.

Each switch H is operated by a switch machine or motor designated by the reference character M with an exponent corresponding with that of the reference character H for the switch. Each motor M may be of a fluid pressure type which is provided with a normal control magnet $nn$, a reverse control magnet $rr$, and a master control or lock magnet $q$.

Normal and reverse control magnets $nn$ and $rr$ for motor M$^4$ for operating switch H$^4$ are controlled by a neutral contact 11 of a polarized switch control relay $m^4$ and by a polar contact 12 of the same relay in its normal or its reverse position, respectively. Lock magnet $q$ for motor M$^4$ is controlled by back contacts of normal and reverse indication relays designated by the reference characters $i^4$ and $t^4$, respectively. The control circuits for the motor of switch H$^1$ are similar to those for motor M$^4$, and are therefore omitted from the drawings.

Normal and reverse control magnets $nn$ and $rr$ for motors $M^3$ and $M^{3a}$ for operating switches $H^3$ and $H^{3a}$, respectively, of crossover $ff$ are controlled, with the normal magnets $nn$ in series, and with the reverse magnets $rr$ in series, by a polar contact $12^{m3}$ in its normal or its reverse position, and by a neutral contact $11^{m2}$. These are contacts of a polarized switch control relay $m^3$. Lock magnets $q$ for motors $M^3$ and $M^{3a}$ are controlled in series by back contacts of normal and reverse indication relays $i^3$ and $t^3$, respectively. The control circuits for the motors for operating switches $H^2$ and $H^{2a}$ of crossover $ee$ are similar to those for motors $M^3$ and $M^{3a}$, and are therefore not shown in the drawings.

Operated in conjunction with switch $H^4$ is a pole-changer 5. A similar pole-changer is operated in conjunction with switch $H^1$. Operated in conjunction with switches $H^3$ and $H^{3a}$ are pole-changers 6 and 7, respectively. Similar pole-changers are operated in conjunction with switches $H^2$ and $H^{2a}$, respectively.

A polarized switch indication relay $h^4$ is so controlled by pole-changer 5 of switch $H^4$ that it becomes energized in the normal or the reverse direction according as switch $H^4$ is operated to its normal or its reverse position, respectively. A second polarized switch indication relay $h^1$ is similarly controlled in conjunction with switch $H^1$. A third polarized switch indication relay $h^3$ is so controlled by a circuit including pole-changers 6 and 7 of switches $H^3$ and $H^{3a}$, respectively, in series that it becomes energized in the normal or the reverse direction according as switches $H^3$ and $H^{3a}$ are operated to their normal or reverse positions, respectively. A fourth polarized switch indication relay $h^2$ is similarly controlled in conjunction with switches $H^2$ and $H^{2a}$.

A normal indication relay, designated by the reference character $i$, and a reverse indication relay, designated by the reference character $t$, are associated with each switch and are distinguished by exponents corresponding to those of the corresponding switches. Each relay $i$ is controlled by a neutral front contact and by a normal polar contact of the polarized indication relay $h$ and of the polarized control relay $m$ for its switch as well as by a back contact of the reverse indication relay $t$ for the same switch. Each relay $t$ is controlled by a neutral front and a reverse polar contact of the polarized indication relay $h$ and of the polarized control relay $m$ for its switch as well as by a back contact of the normal indication relay $i$ for the same switch.

Each switch control relay $m$ is controlled by a lock relay designated by the reference character R with an exponent corresponding to that of the associated switch, and by normal and reverse switch lever repeater relays designated by the reference characters $f$ and $g$, respectively, with corresponding exponents. A resistor 75 is connected in multiple with the winding of each relay $m$ in order to make the relay $m$ slow in releasing.

Each normal lever repeater relay $f$ has a stick circuit controlled by a back contact of the associated reverse lever repeater relay $g$, and has a pick-up circuit controlled by a normal contact of a switch lever designated by the reference character $k$ with a corresponding exponent, shown in Fig. 2ª or 2ᵇ, or of a switch lever designated by the reference character $y$ with a corresponding exponent, shown in Fig. 6. Each reverse lever repeater relay $g$ has a stick circuit controlled by a back contact of the associated normal level repeater relay $f$, and has a pick-up circuit controlled by a reverse contact of a switch lever $k$ of Fig. 2ª or 2ᵇ or of a switch lever $y$ of Fig. 6.

Each lock relay R is controlled by the associated polarized switch control relay $m$ and by the associated normal and reverse lever repeater relays $f$ and $g$ as well as by one or more track relays T and by an approach locking relay designated by the reference character P with a distinguishing exponent, shown in Figs. 2ª and 2ᵇ, and also by one or more route locking relays designated by the reference character V with a distinguishing exponent.

The tracks relay T for the first track section in advance of each of the groups of signals $S^1$ and $S^4$ controls, in part, a repeater stick relay designated by the reference character U with an exponent corresponding with that of the track relay by which it is controlled.

Each approach locking relay P shown in Figs. 2ª and 2ᵇ is so controlled that it becomes deenergized when a signal for a route with which it is associated is controlled to indicate "proceed". Each route locking relay V is so controlled that it becomes deenergized when an approach locking relay P for a route which it controls is deenergized. Each relay V can then be reenergized if the associated relay P is again energized before a train enters its route at the signal. Each relay V, after a train enters its route while its associated signal is indicating proceed, can be reenergized only after the train has left a given portion of its route.

In each of the drawings, the contacts operated by the various relays or by the time release J or by other control devices including the control levers shown in Figs. 2 and 6 are identified by numbers, such numbers having distinguishing exponents when the contacts are shown elsewhere than adjacent the respective relay or release or other control device by which they are operated. The exponent for each of these contact numbers comprises the reference character and exponent for the respective relay, release or other control device by which the associated contact is operated. For example, the exponent $T^2$ for contact $109^{T2}$ shown in the circuit for relay $V^{2w}$ in Fig. 1ª comprises the reference character T and its exponent 2 for the track relay $T^2$ which operates contact $109^{T2}$. Similarly, exponent $V^{3e}$ for contact $45^{V3e}$ shown in the circuit for relay $R^4$ in Fig. 1ᵇ comprises reference character V and its exponent $3^e$ for relay $V^{3e}$ which operates contact $45^{V3e}$. In Figs. 2ª and 2ᵇ, two groups of contacts are shown for time release J. Different types of contacts operated by release J are distinguished by the exponents $a$ and $b$, and the contacts which are shown in Fig. 2ᵇ separate from release J have the additional exponent character J.

In Figs. 2ª and 2ᵇ, a track diagram or track model is shown together with representations of signals S, the locations of which representations with respect to the track diagram correspond to the locations of the signals with respect to the tracks shown in Figs. 1ª and 1ᵇ. Indicator lamps $e$ controlled by various track relays T are shown mounted in the track model in locations corresponding to the locations of the associated track circuits.

Adjacent the track model, switch control levers are shown, one for each switch, designated by the reference character $k$ with an exponent corresponding to that of the switch it governs. Each switch lever $k$ has normal and reverse positions $n$ and $r$ for controlling energization of normal and reverse lever repeater relays $f$ and $g$, respectively, shown in Fig. 1$^b$.

Three indicator lamps are shown adjacent each of these switch levers. Considering the lamps adjacent lever $k^4$, for example, lamp $e^{k4n}$ is lighted when normal lever repeater relay $f^4$ and normal switch indication relay $i^4$ are energized, thus indicating that switch H$^4$ is in its normal position in agreement with the energization of the normal lever repeater relay; lamp $e^{k4r}$ is lighted when reverse lever repeater relay $g^4$ and reverse switch indication relay $t^4$ are energized, indicating when switch H$^4$ is in its reverse position in agreement with the energization of reverse lever repeater relay $g^4$; and lamp $e^{k4}$ is lighted when lock relay R$^4$ is deenergized, indicating that the energization of switch control relay $m^4$ can not be changed to cause operation of switch H$^4$. Lamp $e^{k4}$ may be of some color such, for example, as red, in order to readily distinguish it from lamps $e^{k4n}$ and $e^{k4r}$ which may be of some other color such, for example, as white. The lamps for each of the other switch levers $k^1$, $k^2$ and $k^3$ are controlled similarly to the lamps for lever $k^4$, and hence their circuits are omitted from the drawings.

Signal control levers designated by the reference characters $u^a$ and $u^b$ are shown below switch levers $k$. Each of the signal control levers $u$ has a normal position $n$, a reverse position to the left $p$, and a reverse position to the right $r$. Lever $u^a$, when moved to its $p$ position, controls the clearing of signals S$^4$, and, when moved to its $r$ position, controls the clearing of signals S$^2$ and S$^3$. Lever $u^b$, when moved to its $r$ position, controls the clearing of signals S$^1$, and, when moved to its $p$ position, controls the clearing of signals S$^5$ and S$^6$.

Lever $u^b$, when moved to its $r$ position, causes the energization of a preliminary signal control relay Z$^1$ for controlling signals S$^1$ provided no opposing signal is controlled to display the proceed indication. When lever $u^b$ is moved to its $p$ position, it causes the energization of a second preliminary signal relay Z$^{5-6}$ for controlling signal S$^5$ or S$^6$, provided no opposing signal is controlled to display the proceed indication. A call-on signal relay ZZ$^1$ is controlled in part by a push button circuit controller contact $w^b$ for causing signal S$^{1c}$ to display a call-on indication.

Signal relay Z$^{2-3}$ is controlled in part by lever $u^a$ in its $r$ position, and a signal relay Z$^4$ is controlled in part by lever $u^a$ in its $p$ position similarly to the manner in which relays Z$^1$ and Z$^{5-6}$ are controlled by lever $u^b$. Call-on control relay ZZ$^4$ is controlled by push button circuit controller $w^a$ similarly to the manner in which relay ZZ$^1$ is controlled by push button circuit controller $w^b$. The circuits for relays Z$^{2-3}$, Z$^4$ and ZZ$^4$ are therefore omitted from the drawings.

Four indicator lamps are shown adjacent each signal lever $u$. Considering the lamps for lever $u^b$, lamps $e^{u5}$ and $e^{u8}$ may be of one color, white for example, while lamps $e^{u6}$ and $e^{u7}$ may be of a different color, such, for example, as red, to make the indicators more readily distinguishable. The lighting of lamp $e^{u8}$ indicates that although lever $u^b$ is in its right-hand position and relay Z$^1$ is energized for clearing one of the signals S$^1$, a corresponding signal control relay Y has not become energized. Similarly, the lighting of lamp $e^{u5}$ indicates that although lever $u^b$ is in its left-hand position and relay Z$^{5-6}$ is energized for clearing one of the signals S$^5$ or S$^6$, the corresponding signal control relay Y has not become energized. The lighting of lamp $e^{u7}$ for signals S$^1$ indicates that none of these signals can be cleared because an opposing signal has been cleared. Similarly, the lighting of lamp $e^{u6}$ indicates that neither signal S$^5$ nor S$^6$ can be cleared because an opposing signal has been cleared.

Approach locking relays are designated by the reference character P with distinguishing exponents corresponding to those of the associated signal relays Z. Each of these approach locking relays is controlled in part by its signal relay Z.

Time releasing of approach locking relays P is controlled by the time releasing device J which may be of the normally unwound clockwork type. Group releasing of approach locking relays P is provided, that is, the one release J controls the releasing for all of the relays P.

Release J is equipped with two normally open contacts 259 and 246$^J$, and with six normally closed contacts 261$^a$, 266$^b$, 268$^b$, 248$^{Ja}$, 253$^{Jb}$, and 255$^{Jb}$. Normally open contacts 259 and 246$^J$ can become closed only when release J is fully wound up.

In order to release any one of the approach locking relays P, time release J must first be wound up to open the six normally closed contacts and to close the normally open contacts 259 and 246$^J$ and thereby cause the energization of one or the other, or both, of two slow releasing relays N$^a$ and N$^b$, respectively. Relay N$^a$ enters into the control of approach locking relays P$^{2-3}$ and P$^4$, whereas relay N$^b$ similarly enters into the control of approach locking relays P$^1$ and P$^{5-6}$.

When time release J is permitted to run down after being fully wound up, contacts 259 and 246$^J$ will open as release J leaves its fully wound position, and contacts 266$^b$, 268$^b$, 253$^{Jb}$ and 255$^{Jb}$ will close upon the lapse of a measured interval of time after the beginning of the unwinding operation. Upon the lapse of a further measured period of time, contacts 261$^a$ and 248$^{Ja}$ will also close.

Referring next to Fig. 3, the circuits here shown form what is termed a route check network. Route relays, designated by the reference character X with distinguishing exponents, control the signals which have similar exponents. For example, relay X$^1$ controls signals S$^1$, and relay X$^{2-3}$ controls signals S$^2$ and S$^3$.

For each route with which a relay X is associated, a signal lock relay, designated by the reference character I with an exponent corresponding to that of the relay X for an opposing signal, is controlled in series with the relay X for the route. Energization of any route relay X causes energization of the relay I which is in series with it, and the relay I then prevents energization of the signal relay Z for the opposing signal of the same route.

In Fig. 4, circuits are shown for relays, designated by the reference characters L$^1$ and L$^4$, which are termed signal slotting relays. Relay L$^1$ enters into the control of signal S$^{1a}$, and relay L$^4$ enters into the control of signal S$^{4a}$.

Fig. 5 shows circuits which constitute what is known as a signal control relay or route circuit network. A signal control relay for controlling each signal, and designated by the reference character Y with an exponent corresponding to that of its signal, is controlled by these circuits.

Referring now to Fig. 6, a track diagram or track model similar to the one shown in Figs. 2$^a$ and $2^b$ is here shown. A different type of control lever for the switches and signals is, however, provided for mounting in the track model adjacent the diagrams of the switches and signals which these levers control. Each of these switch and signal levers or keys is designated by the reference character $y$ with a distinguishing exponent similar to that of the switch or signal which it controls. Lever $y^{S1}$, for controlling signals $S^1$, and lever $y^{S4}$, for controlling signals $S^4$, have normal positions $n$, reverse positions $r$, and lower or call-on positions $z$. Each of the other signal levers and each of the switch levers has only two positions, a normal and a reverse position, designated by the reference characters $n$ and $r$, respectively.

Signal relays Z and call-on control relays ZZ are controlled by the signal levers of Fig. 6 similarly, in general, to the relays Z and ZZ of Figs. $2^a$ and $2^b$. Only the circuits for relays $Z^1$, $ZZ^1$ and $Z^{2-3}$ are shown, since the circuits for the other relays Z and ZZ, controlled by the signal levers of Fig. 6, are similar to the circuits for relays $Z^1$ and $ZZ^1$.

Only one indicator lamp is shown for each switch and signal lever of Fig. 6. Each of these lamps is shown enclosed by its lever, and is designated by the reference character $e$ with a distinguishing exponent corresponding to that of its lever.

A signal indication relay, designated by the reference character $b^1$, is shown for controlling in part the signal indicator lamp $e^{S1}$ for signals $S^1$. This lamp is controlled by a signal lock relay $I^1$ to display a steady light if the signal relay for the associated signal is prevented from being energized because an opposing signal is controlled to display a proceed indication. When lever $y^{S1}$ is in its normal position, as shown in the drawings, relay $I^1$ is deenergized, lamp $e^{S1}$ is controlled by a contact 289 of a coding device W to display a flashing light if relays $b^1$ and $Z^1$ are both deenergized. When lever $y^{S1}$ is moved to its reverse position or to its call-on position, lamp $e^{S1}$ will display a flashing light until a signal control relay Y for one of the signals $S^1$ becomes energized. Circuits for controlling other signal lever lamps $e$ are similar to those just described for lamp $e^{S1}$, and are therefore omitted from the drawings.

Coding device W may be of a type having a control winding 286, a control contact 287 which is biased by a spring 288 to the position in which it is shown in the drawings, and a contact 289 operated in conjunction with contact 287. With contact 287 in the position in which it is shown in the drawings, a circuit is completed for energizing winding 286, passing from terminal $x$ of a source of current not shown in the drawings, through contact 287, and winding 286 of coder W to terminal $o$. Winding 286, when thus energized, attracts contact 287 until contact 289 closes and contact 287 opens. Spring 288 then returns contact 287 as far as the position in which it is shown in the drawings, and momentum may carry contact 287 beyond the position in which it is shown in the drawings. Winding 286 then pulls contact 287 back again, causing the operation to be repeated. Contact 289 becomes closed each time winding 286 attracts contact 287, and opens when spring 288 returns contact 287 to the position in which it is shown in the drawings. Coding device W may be designed to open and close contact 289 at any suitable rate, for example of the order of 180 times per minute.

Normal and reverse switch lever repeater relays $f$ and $g$ are controlled by switch levers $y$, similarly to the manner in which such relays are shown controlled by lever $k^4$ in Fig. $1^b$. Normal and reverse switch indication relays $i$ and $t$ are controlled similarly to the way in which relays $i^4$ and $t^4$, respectively, are shown controlled in Fig. $1^b$. Lock relays R are controlled as shown in Fig. $1^b$. The circuits for relays $f$, $g$, $i$, $t$ and R are therefore omitted from Fig. 6.

Each switch lever lamp $e$ is controlled to display a steady light if its lock relay R is deenergized while its normal or its reverse indication relay $i$ or $t$ is energized to correspond with its normal or its reverse lever repeater relay $f$ or $g$, respectively. Each switch lever lamp $e$ is controlled to display a flashing light if its indication relays $i$ and $t$ do not correspond in the energized or deenergized condition with its lever repeater relays $f$ and $g$, respectively. Circuits are shown for lighting lamp $e^{H4}$, but are omitted for the other switch lever lamps because the circuits for these other lamps are similar to the circuits shown for lamp $e^{H4}$.

Figs. $7^a$ and $7^b$ show communication circuits for reducing the number of line wires between the switch and signal locations and the point of control when the intervening distance is long, or when for some other reason the addition of such communication circuits is desirable. A portion of the apparatus of Fig. 6 is shown modified for use with such communication circuits. The rest of the apparatus of Fig. 6 could be similarly modified for such use, and is therefore omitted from the drawings.

Lever $y^{S1}$, of Fig. $7^a$, when moved to its $r$ position, completes an energizing circuit for a signal lever relay $Q^1$, through a back contact of a signal lever call-on relay $K^1$. Lever $y^{S1}$, when moved to its $z$ position, completes an energizing circuit for relay $K^1$ through a back contact of relay $Q^1$. Lever relays $Q^1$ and $K^1$ control signal and call-on communication relays $Q^{Q1}$ and $K^{K1}$, respectively. By using two sources of unidirectional current, such, for example, as batteries $yy$ and $zz$, and by using two asymmetric units $v^{11}$ and $v^{12}$ such, for example, as the well-known copper oxide rectifier valve, relays $Q^{Q1}$ and $K^{K1}$ are controlled over the same pair of line wires comprising control wire 346 and a common conductor $c$. Communication relays $Q^{Q1}$ and $K^{K1}$, in turn, control signal and call-on relays $Z^1$ and $ZZ^1$, respectively.

Normal and reverse switch lever repeater relays $f$ and $g$ are controlled by switch levers $y$, similarly to the manner in which relays $f^4$ and $g^4$ are shown controlled by lever $k^4$ in Fig. $1^b$. Control circuits for relays $f$ and $g$ are therefore omitted from Figs. $7^a$ and $7^b$. Lever repeater relays $f^4$ and $g^4$ are shown controlling normal and reverse switch lever communication relays $f^{f4}$ and $g^{g4}$, respectively, through valves $v^7$, $v^8$, $v^9$ and $v^{10}$, a conductor 345, and the common conductor $c$. Each asymmetric unit or valve $v$ permits current to flow freely in the direction indicated by the arrowhead portion of its symbol, but prevents the flow of sufficient current in the opposite direction to operate the associated relay. Relays $f^{f4}$ and $g^{g4}$ enter into the control of polarized relay $m^4$ and lock relay $R^4$ similarly to the manner shown for relays $f^4$ and $g^4$ in Fig. $1^b$.

Normal and reverse indication communication relays $i^{i4}$ and $t^{t4}$ are controlled over conductors 341 and $c$ by normal and reverse indication relays $i^4$ and $t^4$, respectively; switch lock communicating relay $R^{R4}$ is controlled over conductors 342 and c by lock relay $R^4$; signal lock communication relay $I^{11}$ and a signal indication communication relay $b^{b1}$ are controlled over conductors 343 and c by signal lock relay $I^1$ and signal indication relay $b^1$, respectively; and track repeater communication relays $T^{T2}$ and $T^{T3}$ are controlled over conductors 344 and c by track relays $T^2$ and $T^3$, respectively. By the use of a coding device $W^b$, which is similar to coding device W of Fig. 6, relays $T^{T2}$ and $T^{T3}$ may be controlled to contemporaneously retain their contacts in the attracted position.

Switch and signal lever indication lamps e are controlled by communication relays, similarly to the manner in which these lamps are controlled by the associated indication or control relays in Fig. 6. The coding device $W^a$, which is also similar to coding device W of Fig. 6, causes switch and signal indicator lamps e to at times display flashing indications.

Having described, in general, the arrangement and operation of various forms of apparatus embodying our invention, we will now trace in detail the operation of these various forms of apparatus.

As shown in the drawings, all parts are in the normal condition, that is, each track relay T is energized; each switch and signal lever k and u, respectively, of Figs. $2^a$ and $2^b$, and each switch and signal lever y of Figs. 6 and $7^a$ is normal; each switch H is in its normal position in which it is shown; each signal S is in its stop position; and relays g, t, Z, ZZ, N, X, I, Y, b, K, Q, tt, II, bb, TT, gg, QQ and KK are deenergized.

We will first trace the operation of the form of apparatus shown in Figs. $1^a$ to 5, inclusive.

With relay $T^1$ energized, a pick-up circuit for relay $P^1$ of Fig. $2^b$ is closed, passing from terminal x, through contacts $13^{Y1a}$, $14^{Y1b}$, $15^{Y1c}$, contact 16 of relay $Z^1$, contacts $17^{X1}$ and $18^{T1}$, and the winding of relay $P^1$ to terminal o. A stick circuit is also closed for relay $P^1$, and follows the path just traced for the pick-up circuit as far as contact $17^{X1}$, and then passes through the front point of contact 19 of relay $P^1$, to the winding of relay $P^1$. With relays $T^5$, $T^6$ and $T^{10}$ energized, pickup and stick circuits are closed for relays $P^{5-6}$, $P^{2-3}$ and $P^4$, respectively. These pickup and stick circuits are similar to those just traced for relay $P^1$, and may therefore be readily traced on the drawings without further explanation.

With switch $H^4$ in its normal position, switch indication relay $h^4$ is energized, in the normal direction, by a circuit which includes pole-changer 5 of switch $H^3$ in its normal position. With switches $H^3$ and $H^{3a}$ in their normal positions, relay $h^3$ is energized, in the normal direction, by a circuit of a well-known type and which includes pole-changers 6 and 7 of switches $H^3$ and $H^{3a}$, respectively, in their normal positions. Circuits for energizing switch indication relays $h^2$ and $h^1$ are similar to the circuits just described for relays $h^3$ and $h^4$, respectively, and are therefore omitted from the drawings.

With lever $k^4$ in its normal position, normal lever repeater relay $f^4$ is energized by a pickup circuit passing from terminal x, through contact $39^{K4}$ closed in the n position, and the winding of relay $f^4$ to terminal o. A stick circuit for relay $f^4$ is also closed, passing from terminal x, through contact 40 of relay $g^4$, contact 41 of relay $f^4$, and the winding of relay $f^4$ to terminal o. Pickup and stick circuits are also closed for energizing relays $f^3$, $f^2$ and $f^1$. The pickup circuits for these relays are controlled by contacts $39^{k3}$, $39^{k2}$, and $39^{k1}$, similarly to the manner in which the pickup circuit for relay $f^4$ is controlled by contact $39^{k4}$. The stick circuits for these relays are controlled by relays $g^3$, $g^2$ and $g^1$, similarly to the manner in which the stick circuit for relay $f^4$ is controlled by relay $g^4$. The pickup and stick circuits for relays $f^3$, $f^2$ and $f^1$ are therefore omitted from the drawings.

A route locking relay, designated by the reference character $V^{3e}$, is energized by circuits which will presently be described. With this relay energized, and with relays $T^4$, $P^{5-6}$ and $f^4$ energized, a pickup circuit is closed for relay $R^4$, passing from terminal x, through contact 44 of relay $T^4$, contacts $45^{V3e}$ and $46^{P5-6}$, winding of relay $R^4$, contact 62 of relay $f^4$, and contact 63 of relay $m^4$ in its normal position to terminal o. A stick circuit for relay $R^4$ is also closed, following the path just traced for the pickup circuit as far as the winding of relay $R^4$, and thence through contact 66 of relay $R^4$ to terminal o. A stick circuit is closed for relay $R^3$, passing from terminal x, through contacts $47^{V3e}$, $48^{V3ae}$, $49^{V3w}$, $50^{P4}$, $51^{T9}$ and $52^{T3}$, winding of relay $R^3$, and contact 66 of relay $R^3$ to terminal o. A stick circuit is closed for relay $R^2$, passing from terminal x, through contacts $53^{V2w}$, $54^{V2aw}$, $55^{V2ae}$, $56^{P1}$, $57^{T8}$, and $58^{U2}$, winding of relay $R^2$, and contact 66 of relay $R^2$ to terminal o. A stick circuit is closed for relay $R^1$, passing from terminal x, through contacts $59^{V2aw}$, $60^{P2-3}$, and $61^{T7}$, winding of relay $R^1$, and contact 66 of relay $R^1$ to terminal o. A pickup circuit is also closed for each of the relays $R^3$, $R^2$ and $R^1$, following the stick circuit as far as the winding of each of these relays, and thence passing through a contact of an associated normal lever relay f and a normal polar contact of an association polarized switch control relay m, similarly to the pickup circuit traced for relay $R^4$. Each of the relays R has also a second pickup circuit, normally open, which follows the path of the first pickup circuit through the winding of the relay, and thence passes through a contact 64 of an associated reverse lever relay g and a reverse polar contact 65 of an associated polarized switch control relay m.

With relays $f^4$ and $R^4$ energized, a normal pickup circuit is closed for relay $m^4$, passing from terminal x, through the back point of contact 67 of relay $g^4$, front point of contact 68 of relay $f^4$, front point of contact 71 of relay $R^4$, winding of relay $m^4$, front point of contact 72 of relay $R^4$, front point of contact 73 of relay $f^4$, and the back point of contact 74 of relay $g^4$ to terminal o. Circuits for energizing relays $m^3$, $m^2$ and $m^1$ are similar to the circuits for relay $m^4$, and are therefore omitted from the drawings.

With relay $m^4$ energized by current of normal polarity, normal control magnet nn for motor $M^4$ is energized by its circuit passing from terminal x, through contact 11 of relay $m^4$, contact 12 of relay $m^4$ in its left-hand position, and the winding of magnet nn to terminal o. The circuit for lock magnet q of motor $M^4$ is, however, open at contact 277 of relay $i^4$, and hence motor $M^4$ is deenergized. Relays $m^3$, $m^2$ and $m^1$ are also energized by current of normal polarity, and therefore the normal control magnet nn for the motor M for each of the switches $H^3$, $H^2$ and $H^1$ is also energized. The lock magnets q for these motors are, however, deenergized, and hence the motors for switches $H^3$, $H^2$ and $H^1$ are also deenergized.

With relays $h^4$ and $m^4$ both energized in the normal direction, a circuit is completed for energizing normal indication relay $i^4$, passing from terminal $x$, through a resistor 346, contact 65 of relay $m^4$ in its left-hand position, contact 69 of relay $m^4$, contact 76 of relay $t^4$, winding of relay $i^4$, contact 78 of relay $h^4$ in its left-hand position, and contact 79 of relay $h^4$ to terminal $o$. The circuits for energizing relays $i^3$, $i^2$ and $i^1$ are similar to the circuit just traced for relay $i^4$, and are therefore omitted from the drawings.

Circuits for energizing relays $t^3$, $t^2$ and $t^1$ are similar to the circuit shown, and which will be traced hereinafter, for relay $t^4$, and are therefore also omitted from the drawings.

Figure 2B:
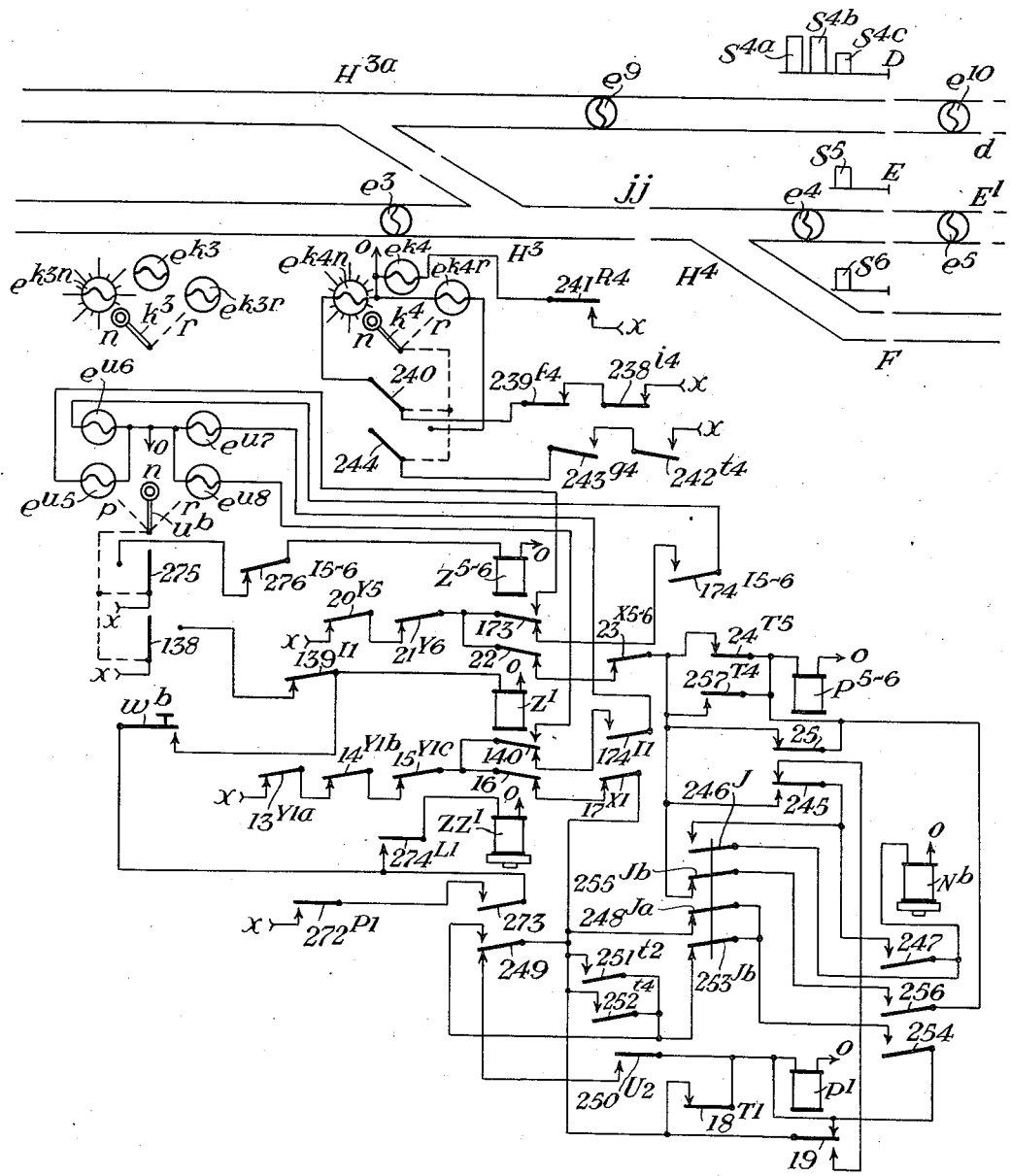

With lever $k^4$ in its $n$ position, and with relays $f^4$ and $i^4$ energized, indicator lamp $e^{k4n}$, shown in Fig. 2b, is energized by a circuit passing from terminal $x$, through contacts $238^{i4}$ and $239^{f4}$, contact 240 of lever $k^4$, and lamp $e^{k4n}$ to terminal $o$.

With the various relays P, T, U, $t$ and $i$ energized, one or more pickup and stick circuits are closed for each of the route locking relays V. For example, a pickup circuit for relay $V^{2ae}$ is closed, passing from terminal $x$, through contacts $80^{P2-3}$, $81^{P1}$, $83^{T7}$, $84^{T8}$, $85^{U2}$, and the winding of relay $V^{2ae}$ to terminal $o$. A second pickup circuit is also closed for relay $V^{2ae}$, which is the same as the pickup circuit just traced except that it includes contact $82^{i2}$ instead of contact $81^{P1}$. A third pickup circuit for relay $V^{2ae}$ is also closed, and is the same as the first pickup circuit except that it includes contact $86^{i2}$ instead of contact $85^{U2}$. A stick circuit for relay $V^{2ae}$ is closed, passing from terminal $x$, through contacts $80^{P2-3}$ and $81^{P1}$, contact 87 of relay $V^{2ae}$, and the winding of relay $V^{2ae}$ to terminal $o$. A second stick circuit for relay $V^{2ae}$ is also closed, and is the same as the first stick circuit except that it includes contact $82^{i2}$ instead of contact $81^{P1}$.

With relays $T^2$ and $P^1$ energized, a pickup circuit is closed for track repeater stick relay $U^2$, passing from terminal $x$, through contact 115 of relay $T^2$, contact $116^{P1}$, and the winding of relay $U^2$ to terminal $o$. A stick circuit for relay $U^2$ is also closed, passing from terminal $x$, through contact 115 of relay $T^2$, contact 120 of relay $U^2$, and the winding of relay $U^2$ to terminal $o$. Relay $U^9$ is also energized by similar pickup and stick circuits which, on account of the circuits for relay $U^2$ having been traced, may be readily followed on the drawings.

On account of the various relays $i$, T and U being energized, each of the signal slotting relays L is energized. The circuit for relay $L^1$ passes from terminal $x$, through contacts $126^{i2}$, $127^{i4}$, $128^{U2}$, $129^{T3}$, $130^{T4}$, and $131^{T5}$, and the winding of relay $L^1$ to terminal $o$. Relay $L^4$ is energized by a similar circuit which may be readily followed on the drawings.

We will assume that the operator in charge desires to arrange for a traffic movement from A to E. Since each of the switches $H^2$, $H^3$ and $H^4$ is in its normal position in which it is required for this route, it will not be necessary for the operator to change the position of any of the switch levers $k$. He will therefore need to operate only signal lever $u^b$, which he will move to its $r$ position, thereby completing a circuit for energizing relay $Z^1$, passing from terminal $x$, through contact 138 of lever $u^b$, contact $139^{i1}$, and the winding of relay $Z^1$ to terminal $o$.

Relay $Z^1$, upon becoming energized, causes lamp $e^{u8}$ to become energized by its circuit passing from terminal $x$, through contacts $13^{Y1a}$, $14^{Y1b}$ and $15^{Y1c}$, front point of contact 140 of relay $Z^1$, and lamp $e^{u8}$ to terminal $o$. Relay $Z^1$, upon becoming energized, opens its back contact 16, thereby causing relay $P^1$ to become deenergized.

Relay $P^1$, upon becoming deenergized, opens, at its contact $56^{P1}$, the pickup and stick circuits for relay $R^2$, causing this relay to also become deenergized. Relay $P^1$, upon becoming deenergized, also opens its contact $88^{P1}$, causing relay $V^{3e}$ to become deenergized.

Relay $V^{3e}$, upon becoming deenergized, opens its contacts $47^{V3e}$ and $45^{V3e}$ in the pickup and stick circuits for relays $R^3$ and $R^4$, respectively, causing both these relays to become deenergized.

Relay $R^4$, upon becoming deenergized, opens, at the front points of its contacts 71 and 72, the normal energizing circuit for relay $m^4$, and then closes, at the back points of these contacts, a normal stick circuit for relay $m^4$, passing from terminal $x$, through resistor 346, contact 65 of relay $m^4$ in its left-hand position, contact 69 of relay $m^4$, back point of contact 71 of relay $R^4$, winding of relay $m^4$, back point of contact 72 of relay $R^4$, contact 70 of relay $m^4$, and contact 63 of relay $m^4$ in its left-hand position to terminal $o$. Relays $R^3$ and $R^2$, upon becoming deenergized, similarly open normal energizing circuits for relays $m^3$ and $m^2$, and close normal stick circuits for these relays. Therefore, as long as relays $R^2$, $R^3$ and $R^4$ remain deenergized, the direction of energization of relays $m^2$, $m^3$ and $m^4$ can not be changed, but these relays will be retained energized in the normal direction by their normal stick circuits.

Relay $R^4$, upon becoming deenergized, completes a circuit for lamp $e^{k4}$, passing from terminal $x$, through contact $241^{R4}$ and lamp $e^{k4}$ to terminal $o$, causing this lamp to be lighted. Lamps $e^{k2}$ and $e^{k3}$ are similarly lighted when relays $R^2$ and $R^3$ become deenergized.

Relay $P^1$, upon becoming deenergized, opens its contact $81^{P1}$ in various circuits for relay $V^{2ae}$, but this relay will be retained in its energized condition by circuits through contact $82^{i2}$. Relay $P^1$, upon becoming deenergized, also opens its contact $116^{P1}$ in the pickup circuit for relay $U^2$ which, however, remains energized by its stick circuit previously traced.

With relays $P^1$, $R^2$, $R^3$, $R^4$ and $V^{3e}$ deenergized, and with relay $Z^1$ energized, a circuit is completed for energizing route relay $X^1$ and signal lock relay $I^{5-6}$, passing from terminal $x$, through contacts $141^{V3e}$ and $142^{P5-6}$, winding of relay $I^{5-6}$, back point of contact $143^{Z5-6}$, contacts $144^{i4}$, $146^{R4}$, $147^{R3}$, $148^{i3}$, $149^{i2}$, $150^{R2}$, front point of contact $151^{Z1}$, contact $152^{P1}$, and the winding of relay $X^1$ to terminal $o$. Energization of relay $I^{5-6}$ causes lamp $e^{u6}$ to become energized by a circuit passing from terminal $x$, through contacts $20^{Y5}$ and $21^{Y6}$, back point of contact 173 of relay $Z^{5-6}$, contact $174^{I5-6}$, and lamp $e^{u6}$ to terminal $o$. Energization of relay $X^1$, while relays $R^2$, $R^3$, $R^4$ and $V^{3e}$ are deenergized, causes signal control relay $Y^{1a}$ to become energized by a circuit passing from terminal $x$, through contacts $175^{V3e}$ and $176^{P5-6}$, back point of contact $177^{X5-6}$, contacts $178^{R4}$, $179^{i4}$, $181^{i3}$, $182^{R3}$, $183^{i2}$, $184^{R2}$, front point of contact $185^{X1}$, contacts $186^{Nb}$, $187^{i2}$, $188^{i4}$, $189^{L1}$, contact 190 of relay $Y^{1b}$, and the winding of relay $Y^{1a}$ to terminal $o$.

Relay $Y^{1a}$, upon becoming energized, opens, at its back contact $13^{Y1a}$, the circuit previously traced for lamp $e^{u8}$, causing this lamp to become extinguished. Relay $Y^{1a}$, upon becoming energized, causes the arm of signal $S^{1a}$ to be operated to the proceed position by its circuit passing from terminal $x$, through contact $237^{Y1a}$, and the mechanism of signal $S^{1a}$ to terminal $o$.

If, while the arm of signal $S^{1a}$ is in its proceed position, the operator should forget, and should attempt to arrange a different route by reversing one of the switch levers $k^2$, $k^3$ or $k^4$ before a train passes signal $S^{1a}$, the route already arranged will not be affected, and the arm of signal $S^{1a}$ will remain in its proceed position until the operator moves signal lever $u^b$ away from its $r$ position, or until a train passes signal $S^{1a}$. If, for example, the operator reverses lever $k^4$ while lever $u^b$ is in its $r$ position and signal $S^{1a}$ is displaying the proceed indication, relay $g^4$ will become energized by is pickup circuit passing from terminal $x$, through contact $39^{k4}$ in its $r$ position, and the winding of relay $g^4$ to terminal $o$. Relay $g^4$, upon becoming energized, opens its contact 40 in the stick circuit for relay $f^4$ which thereupon becomes deenergized since its pickup circuit is also open at contact $39^{k4}$. A stick circuit is then completed for relay $g^4$, passing from terminal $x$, through contact 42 of relay $f^4$, contact 43 of relay $g^4$, and the winding of relay $g^4$ to terminal $o$. With relay $R^4$ deenergized, this change in condition of relay $f^4$ and relay $g^4$ can not affect the energization of relay $m^4$. Similarly, a change in the energized condition of relays $f^3$ and $g^3$ or $f^2$ and $g^2$ can not affect the energization of relays $m^3$ and $m^2$, respectively, on account of relays $R^3$ and $R^2$ being deenergized.

We will now assume that, with signal $S^{1a}$ displaying the proceed indication for a traffic movement over the route from A to E, and with each of the levers $k$ in its normal position, an eastbound train arrives on the approach section $a$—A, and that the operator then desires to stop the train at signal $S^{1a}$ and send it over some other route than that from A to E. If, for example, he should desire to send the train over the route from A to F, he will return lever $u^b$ to its $n$ position, thus deenergizing relay $Z^1$ by opening contact 138 of lever $u^b$ in the circuit previously traced for relay $Z^1$. Relay $Z^1$, upon becoming deenergized, will open, at the front point of its contact $151^{Z1}$, the circuit previously traced for relays $I^{5-6}$ and $X^1$, causing these relays to become deenergized.

Relay $I^{5-6}$, upon becoming deenergized, will extinguish lamp $e^{u6}$ on account of the opening of contact $174^{I5-6}$. Relay $X^1$, upon becoming deenergized, will open, at the front point of its contact $185^{X1}$, the circuit previously traced for relay $Y^{1a}$, causing relay $Y^{1a}$ to become deenergized. Relay $Y^{1a}$, upon becoming deenergized, will open its contact $237^{Y1a}$ in the operating circuit for signal $S^{1a}$, causing the arm of this signal to return to the stop position.

Relay $P^1$ will still not become energized, even though signal $S^{1a}$ has been returned to the stop condition, because the pickup circuit for relay $P^1$ previously traced is now open at contact $18^{T1}$. In order to energize relay $P^1$, the operator will wind release J up, causing its normally closed contacts $248^{Ja}$, $253^{Jb}$, $255^{Jb}$, $261^a$, $266^b$ and $268^b$ to open, and causing its normally open contacts $246^J$ and 259 to become closed.

Contact $246^J$ now completes a pickup circuit for energizing relay $N^b$, this circuit passing from terminal $x$, through contacts $13^{Y1a}$, $14^{Y1b}$, $15^{Y1c}$, contact 16 of relay $Z^1$, contact $17^{X1}$, back point of contact 19 of relay $P^1$, front point of contact 245 of relay $P^{5-6}$, contact $246^J$, and the winding of relay $N^b$ to terminal $o$. Relay $N^b$, upon becoming energized, will complete its stick circuit, which is the same as the pickup circuit just traced except that it includes contact 247 of relay $N^b$ instead of contact $246^J$.

After having wound release J to close contact $246^J$, the operator will permit release J to start its unwinding operation. Contacts $246^J$ and 259 will open as soon as the unwinding operation starts. Upon the lapse of a measured period of time after the beginning of the unwinding operation, contacts $253^{Jb}$, $255^{Jb}$, $266^b$ and $268^b$ will close, but the closing of these contacts will not complete a pickup circuit for relay $P^1$. Upon the lapse of a further measured period of time, contacts $248^{Ja}$ and $261^a$ will close.

Contact $248^{Ja}$ thereby completes a pickup circuit for relay $P^1$, following the path of the pickup circuit previously traced for relay $P^1$ as far as contact $17^{X1}$, and thence passing through contact $248^{Ja}$, contact 254 of relay $N^b$, and the winding of relay $P^1$ to terminal $o$. Relay $P^1$, upon becoming energized, will complete its stick circuit previously traced. Relay $P^1$, upon becoming energized, opens at the back point of its contact 19, the stick circuit for relay $N^b$, which is thereby deenergized. Relay $P^1$, upon becoming energized, completes, through its contact $56^{P1}$, the pickup circuit for relay $R^2$ which becomes thereby energized. Relay $P^1$ closes its contact $88^{P1}$ in the pickup circuit for relay $V^{3e}$, causing relay $V^{3e}$ to also become energized. Relay $V^{3e}$, upon becoming energized, completes, at its contacts $47^{V3e}$ and $45^{V3e}$, the pickup circuits for relays $R^3$ and $R^4$, causing these relays to again become energized. Relay $R^4$, upon becoming energized, opens, at its contact $241^{R4}$, the circuit previously traced for lamp $e^{k4}$, causing this lamp to be extinguished. Relays $R^2$ and $R^3$, upon becoming energized, similarly cause lamps $e^{k2}$ and $e^{k3}$ to become extinguished.

The operator will now move lever $k^4$ to its $r$ position, thereby opening contact 240 in the circuit for lamp $e^{k4n}$, and so causing this lamp to become extinguished. With lever $k^4$ in its $r$ position, relay $g^4$ will become energized by the pickup circuit previously traced, causing relay $f^4$ to become deenergized, whereupon the stick circuit previously traced for relay $g^4$ will be completed. With relay $f^4$ deenergized, the pickup circuit previously traced for relay $R^4$ is open at contact 62 of relay $f^4$, but relay $R^4$ continues energized by its stick circuit previously traced. With relay $g^4$ and relay $R^4$ now energized, and with relay $f^4$ deenergized, the reverse energizing circuit for relay $m^4$ will be completed, passing from terminal $x$, through the front point of contact 67 of relay $g^4$, back point of contact 73 of relay $f^4$, front point of contact 72 of relay $R^4$, winding of relay $m^4$ in multiple with resistor 75, front point of contact 71 of relay $R^4$, back point of contact 68 of relay $f^4$, and the front point of contact 74 of relay $g^4$ to terminal $o$.

As soon as relay $m^4$ reverses its contact 65, a second pickup circuit will be completed for relay $R^4$, which is the same as the pickup circuit previously traced for this relay as far as its winding, and which thence passes through contact 64 of relay $g^4$, and contact 65 of relay $m^4$, in its right-hand position, to terminal $o$. With relay $m^4$ energized in the reverse direction, the circuit previously traced for relay $i^4$ is open at the left-hand position of contact 65, and hence relay $i^4$ becomes deenergized.

With relay $i^4$ deenergized, a circuit is now completed for the lock magnet $q$ of switch motor $M^4$, passing from terminal $x$, through contact 277 of relay $i^4$, contact 278 of relay $t^4$, and magnet $q$ to terminal $o$. With relay $m^4$ energized in the reverse direction, a circuit is completed for energizing magnet $rr$ of switch motor $M^4$, passing from terminal $x$, through contact 11 of relay $m^4$, contact 12 of relay $m^4$ in its right-hand position, and the winding of reverse magnet $rr$ to terminal $o$. With lock magnet $q$ and reverse magnet $rr$ energized, motor $M^4$ will move switch $H^4$ to its reverse position causing pole-changer 5 to be reversed.

Pole-changer 5, upon becoming reversed, causes relay $h^4$ to be energized in the reverse direction, thereby completing a circuit for reverse indication relay $t^4$, passing from terminal $x$, through resistor 346, contact 63 of relay $m^4$ in its right-hand position, contact 70 of relay $m^4$, contact 77 of relay $i^4$, winding of relay $t^4$, contact 78 of relay $h^4$ in its right-hand position, and contact 79 of relay $h^4$ to terminal $o$. Relay $t^4$ upon becoming energized, opens, at its contact 278, the circuit traced for lock magnet $q$. With lever $k^4$ in its $r$ position, and with relays $g^4$ and $t^4$ energized, indicator lamp $e^{k4r}$ will become lighted by a circuit passing from terminal $x$, through contacts 242$^{t4}$ and 243$^{g4}$, contact 244 of lever $k^4$, and lamp $e^{k4r}$ to terminal $o$.

The operator will now again move lever $u^b$ to its $r$ position, causing relay $Z^1$ to again become energized by its circuit previously traced. Lamp $e^{u8}$ will be thereupon lighted as previously described. Energization of relay $Z^1$ opens the circuit for relay $P^1$ as before. Relay $P^1$, upon becoming deenergized, opens the circuits for relays $R^2$ and $V^{3e}$, as previously described. Relays $R^2$, $R^3$ and $R^4$ are therefore again deenergized, and hence the normal energizing circuits for relays $m^2$ and $m^3$ are open and the normal stick circuits for these relays are closed. With relay $R^4$ deenergized, the reverse energizing circuit for relay $m^4$ is open and a reverse stick circuit is now closed for relay $m^4$, which is similar to the normal stick circuit previously traced except that it includes contacts 63 and 65 in the right-hand position instead of in the left-hand position.

Relay $X^1$ will now be energized by a circuit which is the same as its circuit previously traced except including contact 145$^{t4}$ instead of contact 144$^{i4}$. Relay $X^1$, upon becoming energized, completes a circuit for energizing relay $Y^{1c}$ which, except including contact 180$^{t4}$ instead of contact 179$^{i4}$, is the same as the circuit previously traced for relay $Y^{1a}$ as far as contact 187$^{t2}$, thence passing through contact 194$^{t4}$, contact 197 of relay $Y^{1a}$, contact 198 of relay $Y^{1b}$, and the winding of relay $Y^{1c}$ to terminal $o$. With relay $Y^{1c}$ energized, the arm of signal $S^{1c}$ will be operated to its proceed position by a circuit passing from terminal $x$, through contact 237$^{Y1c}$, and the mechanism of signal $S^{1c}$ to terminal $o$.

We will now assume that all parts of the apparatus have again been returned to the normal condition and that the operator then clears signal $S^{1a}$ for a traffic movement from A to E. We will also assume that the operator clears signal $S^{4a}$ for a traffic movement from D to B. The operation of the apparatus for clearing signal $S^{4a}$ is similar to that previously described for signal $S^{1a}$, and may therefore be readily followed from the drawings.

We will assume that a train now enters approach section $a$—A, and that the dispatcher then decides to send the train over the route from A to F. He will, therefore, return the arm of signal $S^{1a}$ to its stop position, and will then wind up release J and start its unwinding operation as previously described.

We will further assume that after relay $N^b$ becomes energized, but before relay $P^1$ becomes energized, a west-bound train enters section $d$—D, and that the operator then decides to send the westbound train over the route from D to C. He will, therefore, return the arm of signal $S^{4a}$ to its stop position, and will then either wait for release J to close its contact 248$^{Ja}$ for energizing relay $P^1$ before he again winds up the release, or he will at once wind up the release, causing relay $N^a$ to become energized by a circuit passing from terminal $x$, through contacts 32$^{Y4a}$, 33$^{Y4b}$, 34$^{Y4c}$, contact 35 of relay $Z^4$, contact 36$^{X4}$, back point of contact 38 of relay $P^4$, front point of contact 258 of relay $P^{2-3}$, contact 259 of release J, and winding of relay $N^a$ to terminal $o$.

Relay $N^a$, upon becoming energized, completes its stick circuit which is the same as the pickup circuit just traced except including its contact 260 instead of contact 259 of release J. The operator will then permit release J to again unwind. Upon the lapse of a sufficient period of time, both contacts 248$^{Ja}$ and 261$^a$ of release J will close, causing relays $P^1$ and $P^4$, respectively, to become energized. The operator can then cause switches $H^4$ and $H^1$ to be reversed as previously described for switch $H^4$.

We will next assume that the operator again clears signal $S^{1a}$ for a traffic movement from A to E. We will also assume that an eastbound train passes through approach section $a$—A into section A—$ii$. The train, upon entering A—$ii$, deenergizes relay $T^2$ which, in turn, by opening its contact 115, deenergizes relay $U^2$. Relay $T^2$, upon becoming deenergized, opens its contact 92$^{T2}$, thereby preventing energization of relay $V^{3e}$ as long as the train occupies section A—$ii$. Relay $U^2$, upon becoming deenergized, opens, at its contact 128$^{U2}$, the circuit traced for relay $L^1$, causing relay $L^1$ to become deenergized. Relay $L^1$, in turn, opens its contact 189$^{L1}$, causing relay $Y^{1a}$ to become deenergized. The arm of signal $S^{1a}$ thereupon returns to its stop position because of the opening of contact 237$^{Y1a}$. Relay $Y^{1a}$, upon becoming deenergized, again completes the circuit for lamp $e^{u8}$ which is thereby lighted.

As soon as the operator now returns lever $u^b$ to its $n$ position, causing relay $Z^1$ to become deenergized and thereby extinguish lamp $e^{u8}$, a circuit will be completed for energizing relay $P^1$, passing from terminal $x$, through contacts 13$^{Y1a}$, 14$^{Y1b}$, 15$^{Y1c}$, contact 16 of relay $Z^1$, contact 17$^{X1}$, back point of contact 249 of relay $ZZ^1$, contact 250$^{U2}$, and the winding of relay $P^1$ to terminal $o$.

The train, upon entering track section $ii$—$jj$, causes relay $T^3$ to become deenergized. Relay $T^3$, upon becoming deenergized, opens its contact 94$^{T3}$ in the pickup circuits for relay $V^{3e}$, thus preventing this relay from becoming energized when the train leaves section A—$ii$ and permits relay $T^2$ to close its contact 92$^{T2}$.

When the train leaves section A—$ii$, relay $U^2$ will become energized by its pickup circuit previously traced, permitting relay $R^2$ to again become energized by its pickup circuit. Relays $R^3$ and $R^4$, however, continue deenergized while relay $V^{3e}$ is deenergized. Relay $V^{3e}$ will remain deenergized until the train leaves section $ii$—$jj$, whereupon relay $V^{3e}$ will become energized by its pickup circuit passing from terminal $x$, through contact $88^{P1}$, contact $90^{V3ae}$ in multiple with contact $91^{13}$, contacts $92^{T2}$ and $94^{T3}$, and the winding of relay $V^{3e}$ to terminal $o$. Upon the energization of relay $V^{3e}$, relay $R^3$ will become energized by its pickup circuit. Relay $R^4$ will, however, continue deenergized until the train has passed out of section $jj$—E and has permitted relay $T^4$ to complete the pick up circuit for relay $R^4$.

We will assume that all parts of the apparatus are again in their normal condition, and that the operator clears signals $S^{1a}$ for a train to move over the route from A to E. We will further assume that after the train has passed $S^{1a}$, but before it has passed point E, the operator desires to permit a second train to pass point A. He will, therefore, depress push button contact $w^b$ shown adjacent lever $u^b$ in Fig. 2, thereby completing a pickup circuit for energizing call-on relay $ZZ^1$, this circuit passing from terminal $x$, through contact $138$ of lever $u^b$, contact $139^{I1}$, push button contact $w^b$, contact $274^{L1}$, and the winding of relay $ZZ^1$ to terminal $o$. Relay $P^1$ is deenergized on account of relay $Z^1$ being energized, and hence a stick circuit for relay $ZZ^1$ will be completed, passing from terminal $x$, through contact $272^{P1}$, contact $273$ of relay $ZZ^1$, contact $274^{L1}$, and the winding of relay $ZZ^1$ to terminal $o$.

With relay $ZZ^1$ energized, a circuit will now be completed for energizing relay $Y^{1c}$, which is the same as the circuit previously traced for this relay as far as contact $186^{Nb}$, thence passing through contact $196^{ZZ1}$, contact $197$ of relay $Y^{1a}$, contact $198$ of relay $Y^{1b}$, and the winding of relay $Y^{1c}$ to terminal $o$. With relay $Y^{1c}$ energized, the arm of signal $S^{1c}$ will be caused to display a call-on indication by its circuit previously traced through contact $237^{Y1c}$.

We will next assume that all parts of the apparatus are again in their normal condition, and that the operator desires to arranged for a westbound traffic movement from E to A. He will therefore move lever $u^b$ to its left reverse position $p$, thus causing relay $Z^{5-6}$ to become energized by a circuit passing from terminal $x$, through contact $275$ of lever $u^b$, contact $276^{I5-6}$, and the winding of relay $Z^{5-6}$ to terminal $o$. Relay $Z^{5-6}$, upon becoming energized, opens, at its back contact $22$, the pickup and stick circuits for relay $P^{5-6}$ which is thereby deenergized. Relay $Z^{5-6}$, upon closing its contact $173$ at the front point, completes a circuit for lighting lamp $e^{u5}$, passing from terminal $x$, through contacts $20^{Y5}$ and $21^{Y6}$, front point of contact $173$, and lamp $e^{u5}$ to terminal $o$.

Relay $P^{5-6}$, upon becoming deenergized, opens, at its contact $46^{P5-6}$, the pickup and stick circuits for relay $R^4$, causing relay $R^4$ to become deenergized. Relay $P^{5-6}$ upon becoming deenergized, also opens its contact $105^{P5-6}$, causing relay $V^{2w}$ to become deenergized. Relay $P^{5-6}$, by opening its contact $111^{P5-6}$, also causes relay $V^{3w}$ to become energized. Relay $V^{3w}$, upon becoming deenergized, opens its contact $49^{V3w}$, causing relay $R^3$ to become deenergized. Relay $V^{2w}$, upon becoming deenergized, opens its contact $53^{V2w}$, causing relay $R^2$ to become deenergized. Relays $R^2$, $R^3$ and $R^4$, upon becoming deenergized, open the pickup circuits and close the stick circuits for relays $m^2$, $m^3$ and $m^4$, respectively, as previously described for relay $m^4$.

With relays $V^{2w}$, $R^2$, $R^3$, $R^4$ and $P^{5-6}$ deenergized and with relay $Z^{5-6}$ energized, a circuit is completed for energizing relays $I^1$ and $X^{5-6}$, passing from terminal $x$, through contacts $153^{V2w}$ and $154^{P1}$, winding of relay $I^1$, back point of contact $151^{Z1}$, contacts $150^{R2}$, $149^{i2}$, $148^{i3}$, $147^{R3}$, $146^{R4}$ and $144^{i4}$, front point of contact $143^{Z5-6}$, contact $155^{P5-6}$, and the winding of relay $X^{5-6}$ to terminal $o$. Relay $I^1$, upon becoming energized, causes lamp $e^{u7}$ to become energized by a circuit passing from terminal $x$, through contacts $13^{Y1a}$, $14^{Y1b}$, and $15^{Y1c}$, back point of contact $140$ of relay $Z^1$, contact $174^{I1}$, and lamp $e^{u7}$ to terminal $o$. Relay $X^{5-6}$, upon becoming energized, completes, at the front point of its contact $177^{X5-6}$, a circuit for energizing relay $Y^5$, passing from terminal $x$, through contacts $199^{V2w}$, and $200^{P1}$, back point of contact $185^{X1}$, contacts $184^{R2}$, $183^{i2}$, $182^{R3}$, $181^{i3}$, $179^{i4}$ and $178^{R4}$, front point of contact $177^{X5-6}$, contacts $201^{Nb}$ and $202^{i4}$, contact $203$ of relay $Y^6$, and the winding of relay $Y^5$ to terminal $o$.

Relay $Y^5$, upon becoming energized, opens, at its back contact $20^{Y5}$, the circuit previously traced for lamp $e^{u5}$, causing this lamp to become extinguished. Relay $Y^5$, upon becoming energized, also causes signal $S^5$ to be operated to the proceed position by a circuit passing from terminal $x$, through contact $237^{Y5}$, and the mechanism of signal $S^5$ to terminal $o$.

If, after a westbound train enters section E—E$^1$, and before it has passed signal $S^5$, the operator decides to send the train over some other route other than the route from E to A, he will return signal lever $u^b$ to its $n$ position, causing relay $Z^{5-6}$ to become deenergized. Relay $Z^{5-6}$, upon becoming deenergized, opens, at the front point of its contact $143^{Z5-6}$, the circuit previously traced for relays $I^1$ and $X^{5-6}$ which are thereby deenergized. Relay $I^1$, upon becoming deenergized, opens its contact $174^{I1}$, causing lamp $e^{u7}$ to be extinguished. Relay $X^{5-6}$, upon becoming deenergized, opens, at the front point of its contact $177^{X5-6}$, the circuit previously traced for relay $Y^5$ which is thus deenergized. Relay $Y^5$, upon becoming deenergized, opens its contact $237^{Y5}$ in the circuit for signal $S^5$, thereby causing this signal to be returned to its stop position. With the westbound train occupying section E—E$^1$, relay $T^5$ will be deenergized, and hence its contact $24^{T5}$ will be open in a normally closed pickup circuit for relay $P^{5-6}$.

In order to cause the energization of relay $P^{5-6}$, the operator will now again wind up release J. When release J is fully wound up, relay $N^b$ will become energized by a second pickup circuit, passing from terminal $x$, through contacts $20^{Y5}$ and $21^{Y6}$, contact $22$ of relay $Z^{5-6}$, contact $23^{X5-6}$, back point of contact $245$ of relay $P^{5-6}$, contact $246^J$, and the winding of relay $N^b$ to terminal $o$. Relay $N^b$, upon becoming energized, completes a stick circuit which is the same as the pickup circuit just traced except that it includes contact $247$ of relay $N^b$ instead of contact $246^J$. As soon as release J is completely wound up, the operator will permit the unwinding operation of this release to begin. Contacts $246^J$ and $259$ will then open, and, upon a lapse of a measured interval of time, contacts $266^b$, $268^b$, $253^{Jb}$ and $255^{Jb}$ will close. Contact $255^{Jb}$, upon becoming closed, completes a pickup circuit for relay $P^{5-6}$, passing from terminal $x$, through contacts $20^{Y5}$ and $21^{Y6}$, contact $22$ of relay $Z^{5-6}$, contacts $23^{X5-6}$ and $255^{Jb}$, contact $256$ of relay $N^b$, and the winding of relay $P^{5-6}$ to terminal $o$.

Relay $P^{5-6}$, upon becoming energized, opens, at the back point of its contact $245$, the stick circuit previously traced for relay $N^b$. Relay $N^b$, being slow releasing, retains its front contacts closed long enough for relay P$^{5-6}$ to complete its stick circuit which is the same as the pickup circuit traced for relay P$^{5-6}$ as far as contact 23$^{X5-6}$, thence passing through contact 25 of relay P$^{5-6}$, and the winding of relay P$^{5-6}$ to terminal o. Relay P$^{5-6}$, upon becoming energized, completes, at its front contact 46$^{P5-6}$, the pickup circuit previously traced for relay R$^4$. Relay P$^{5-6}$, upon becoming energized, also completes a pickup circuit for relay V$^{3w}$, passing from terminal x, through contacts 111$^{P5-6}$, 112$^{T3}$ and 113$^{T4}$, and the winding of relay V$^{3w}$ to terminal o. Relay V$^{3w}$, upon becoming energized, completes its stick circuit passing from terminal x, through contact 111$^{P5-6}$, contact 114 of relay V$^{3w}$, and the winding of relay V$^{3w}$ to terminal o. Relay P$^{5-6}$, upon becoming energized, also completes a pickup circuit for relay V$^{2w}$, passing from terminal x, through contact 105$^{P5-6}$, contact 107$^{V2aw}$ in multiple with contact 108$^{12}$, contact 109$^{T2}$, and the winding of relay V$^{2w}$ to terminal o. Relay V$^{2w}$, upon becoming energized, completes a stick circuit which is the same as the pickup circuit just traced except that it includes contact 110 of relay V$^{2w}$ instead of contact 109$^{T2}$. Upon the energization of relays V$^{2w}$ and V$^{3w}$, relays R$^2$ and R$^3$, respectively, become energized by their pickup circuits. With relays R$^2$, R$^3$ and R$^4$ again energized, the operator can now arrange some other route for the westbound train.

We will now describe the operation of the second form of apparatus embodying our invention, which comprises the parts shown in Figs. 1$^a$, 1$^b$, a portion of Figs. 2$^a$ and 2$^b$, and Figs. 3 to 6, inclusive. With the apparatus of Fig. 6 in the condition shown in the drawing, lamp e$^{S1}$, for lever y$^{S1}$ which controls signals S$^1$, is displaying a flashing light controlled by a circuit passing from terminal x, through contact 289 of coding device W, back point of contact 290 of relay b$^1$, back point of contact 291 of relay Z$^1$, and lamp e$^{S1}$ to terminal o.

We will now assume that the operator moves lever y$^4$ to its r position for causing switch H$^4$ to be operated to its reverse position. Assuming that contact 39$^{k4}$ of Fig. 1$^b$ is now operated by lever y$^4$ of Fig. 6 instead of by lever k$^4$ of Fig. 2$^b$, relay g$^4$ will become energized by its circuit previously traced, and relay f$^4$ will become deenergized upon the energization of relay g$^4$.

A circuit for causing lamp e$^{H4}$ of Fig. 6 to display a flashing light will be completed when relay g$^4$ becomes energized, this circuit passing from terminal x, through contact 299 of coding device W, front point of contact 294$^{g4}$, back point of contact 299$^{t4}$, and lamp e$^{H4}$ to terminal o. As soon as relay f$^4$ becomes deenergized, a second circuit will be completed for causing lamp e$^{H4}$ to display the flashing indication, this second circuit passing from terminal x, through contact 289 of coding device W, back point of contact 293$^{f4}$, front point of contact 297$^{t4}$, and lamp e$^{H4}$ to terminal o.

As soon as relay m$^4$ has responded to the energization of relay g$^4$ and has caused normal indication relay i$^4$ to become deenergized, the second circuit for lamp e$^{H4}$ will be opened at the front point of contact 297$^{t4}$. Lamp e$^{H4}$, however, will continue to display the flashing light until reverse indication relay t$^4$ has become energized upon the completion of the operation of switch H$^4$ to its reverse position.

When the operator returns switch H$^4$ to its normal position by again energizing relay f$^4$, lamp e$^{H4}$ will be caused to display a flashing light from the time relay f$^4$ becomes energized until relay i$^4$ becomes energized, the circuit for lamp e$^{H4}$, under this condition, passing from terminal x, through contact 289 of coding device W, front point of contact 293$^{f4}$, back point of contact 297$^{t4}$, and lamp e$^{H4}$ to terminal o. A fourth circuit will also be completed for lamp e$^{H4}$ for a brief period, this circuit passing from terminal x, through contact 289 of coding device W, back point of contact 294$^{g4}$, front point of contact 299$^{t4}$, and lamp e$^{H4}$ to terminal o.

If, while switch H$^4$ is in its normal position, relay R$^4$ should, for any reason, become deenergized, lamp e$^{H4}$ will be energized, to display a steady light, by a circuit passing from terminal x, through contact 295$^{R4}$, contact 296$^{f4}$ front point of contact 297$^{t4}$, and lamp e$^{H4}$ to terminal o. If, when switch H$^4$ is in its reverse position, relay R$^4$ should, for some reason, become deenergized, a second circuit will be completed for causing lamp e$^{H4}$ to display a steady light, this circuit passing from terminal x, through contact 295$^{R4}$, contact 298$^{g4}$, front point of contact 299$^{t4}$, and lamp e$^{H4}$ to terminal o.

We will now assume that all parts of the apparatus are returned to the normal condition and that the operator moves lever y$^{S1}$ to its r position for clearing signal S$^{1a}$ for a traffic movement over the route from A to E. A circuit will be completed for relay Z$^1$, passing from terminal x, through contact 279$^{11}$, contact 280 of lever y$^{S1}$ closed in its r position, and the winding of relay Z$^1$ to terminal o. Relay Z$^1$, upon becoming energized, opens, at the back point of its contact 291, the flashing light circuit previously traced for lamp e$^{S1}$. Relay Z$^1$, upon becoming energized, causes relay b$^1$ to be energized by a circuit passing from terminal x, through contacts 13$^{Y1a}$, 14$^{Y1b}$ and 15$^{Y1c}$, front point of contact 140 of relay Z$^1$, and the winding of relay b$^1$ to terminal o. As soon as relay b$^1$ responds to energization by this circuit, the flashing indication control of lamp e$^{S1}$ will be resumed by a second circuit which is the same as the circuit previously traced except including front points of contacts 290 of relays b$^1$ and 291 of relay Z$^1$ instead of the back points of these contacts. As soon as relay Y$^{1a}$ becomes energized for causing signal S$^{1a}$ to display the proceed indication, the circuit for relay b$^1$ will be opened at contact 13$^{Y1a}$, and hence the circuit for lamp e$^{S1}$ will be broken at the front point of contact 290 of relay b$^1$, causing lamp e$^{S1}$ to be extinguished.

If, after the train has passed signal S$^{1a}$, and before it has passed the point E, the operator decides to send a second train past point A, he will move lever y$^{S1}$ to its z position, thereby completing a second circuit for relay Z$^1$, which includes contact 280 closed in the z position of lever y$^{S1}$. Upon the energization of relay X$^1$ as previously described, a pickup circuit will be completed for call-on signal relay ZZ$^1$, passing from terminal x, through contact 279$^{11}$, contact 281 of lever y$^{S1}$, contact 282$^{X1}$, contact 285$^{L1}$, and winding of relay ZZ$^1$ to terminal o. A stick circuit will then be completed for relay ZZ$^1$, passing from terminal x, through contact 283$^{P1}$, contact 284 of relay ZZ$^1$, contact 285$^{L1}$, and the winding of relay ZZ$^1$ to terminal o.

If, while lever y$^{S1}$ is in either its r or its z position, the operator should by mistake attempt to clear an opposing signal, such for example as signal S$^5$ by moving lever y$^{S5}$ to its r position, relay $Z^{5-6}$, being controlled through contact $276^{I5-6}$ of relay $I^{5-6}$ similarly to the manner in which relay $Z^1$ is shown controlled by contact $139^{I1}$, could not be energized because contact $276^{I5-6}$ would then be open. It follows that while a given signal is displaying a proceed indication, a mistake in the operation of the lever for an opposing signal would not cause the first signal to display the stop indication.

Figure 7A:
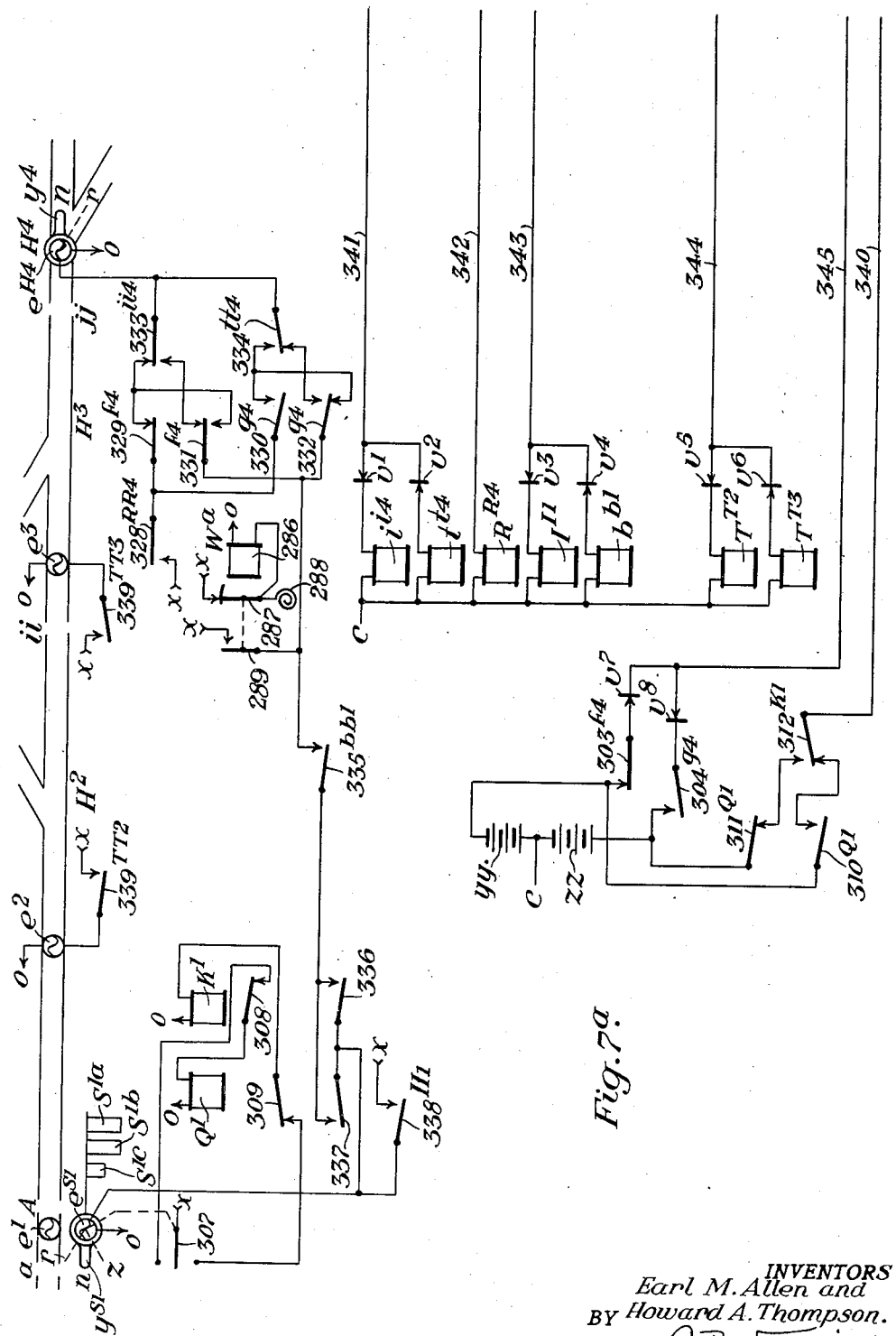
Figure 7B:
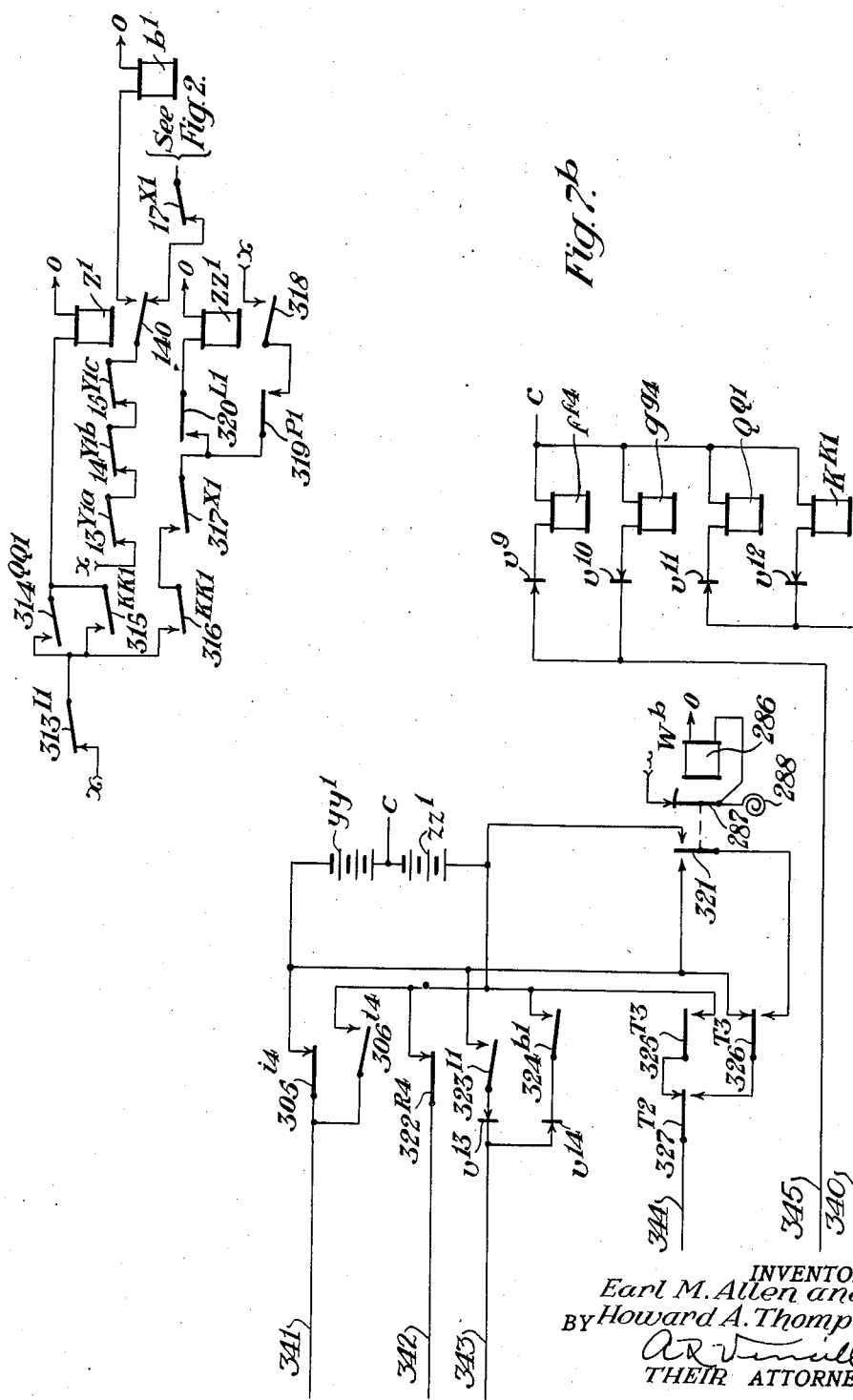

We will now describe the third form of apparatus embodying our invention, which comprises the second form of apparatus modified as shown in Figs. 7a and 7b. As shown in Figs. 7a and 7b, none of the indicator lamps $e$ is lighted. With relay $f^4$ energized as shown in Fig. 1b, communication relay $f^{f4}$ is energized by a circuit passing from a battery $yy$, through contact $303^{f4}$, valve $v^7$, conductor 345, valve $v^9$ winding of relay $f^{f4}$, and conductor $c$ back to battery $yy$.

In this form of apparatus embodying our invention, relays $i$, $t$, $R$, $I$, $b$, and $T$ are located adjacent the switch and signal locations. Communication relays at the point of control are energized by circuits controlled by the relays adjacent the switch and signal locations. Communication relay $i^{i4}$ is energized by a circuit passing from battery $yy^1$, through contact $305^{i4}$, conductor 341, valve $v^1$, winding of relay $i^{i4}$, and conductor $c$ back to battery $yy^1$. Communication relay $R^{R4}$ is energized by a circuit passing from battery $zz^1$, through conductor $c$, winding of relay $R^{R4}$, conductor 342, and contact $322^{R4}$ back to battery $zz^1$. Communication relays $t^{t4}$, $I^{I1}$, and $b^{b1}$ are similarly controlled by associated relays $t^4$, $I^1$ and $b^1$ adjacent the switch and signal layout.

Communication relay $T^{T3}$ is energized when relay $T^2$ is energized and relay $T^3$ is deenergized, the circuit for relay $T^{T3}$ passing from battery $zz^1$, through conductor $c$, winding of relay $T^{T3}$, valve $v^6$, conductor 344, front point of contact $327^{T2}$, and contact $325^{T3}$ back to battery $zz^1$. Communication relay $T^{T2}$ is energized by a circuit which is closed when relay $T^2$ is deenergized and relay $T^3$ is energized, this circuit passing from battery $yy^1$, through the front point of contact $326^{T3}$, back point of contact $327^{T2}$, conductor 344, valve $v^5$, winding of relay $T^{T2}$, and conductor $c$ back to battery $yy^1$. When both relays $T^2$ and $T^3$ are deenergized, both relays $T^{T2}$ and $T^{T3}$ are operated, relay $T^{T2}$ being periodically energized by a circuit passing from battery $yy^1$, through contact 321 of coding device $W^b$ in its left-hand position, back point of contact $326^{T3}$, back point of contact $327^{T2}$, valve $v^5$, winding of relay $T^{T2}$, and conductor $c$ back to battery $yy^1$. Relay $T^{T3}$ is periodically energized by a circuit passing from battery $zz^1$, through conductor $c$, winding of relay $T^{T3}$, valve $v^6$, conductor 344, back point of contact $327^{T2}$, back point of contact $326^{T3}$, and contact 321 of coding device $W^b$ in its right-hand position back to battery $zz^1$.

If the operator desires to clear signal $S^{1a}$ for a train movement from A to E, he will move lever $y^{S1}$ to its $r$ position, thereby completing a circuit for energizing relay $Q^1$, this circuit passing from terminal $x$, through contact 307 closed in the $r$ position of lever $y^{S1}$, contact 308 of relay $K^1$, and the winding of relay $Q^1$ to terminal $o$. Relay $Q^1$, upon becoming energized, completes a circuit for energizing communication relay $Q^{Q1}$, passing from battery $yy$, through contact $310^{Q1}$, back point of contact $312^{K1}$, conductor 340, valve $v^{11}$, winding of relay $Q^{Q1}$, and conductor $c$ back to battery $yy$. Upon the energization of relay $Q^{Q1}$, a circuit is completed for relay $Z^1$, passing from terminal $x$, through contacts $313^{I1}$ and $314^{QQ1}$, and the winding of relay $Z^1$ to terminal $o$. Energization of relay $Z^1$ causes operation of apparatus for clearing signal $S^{1a}$ in the manner already described.

If, after a train has passed signal $S^{1a}$, and before it has passed point E, the operator should desire to send another train past signal $S^{1a}$, he will move lever $y^{S1}$ to its $z$ position, thereby completing a circuit for relay $K^1$, passing from terminal $x$, through contact 307 closed in the $z$ position of lever $y^{S1}$, contact 309 of relay $Q^1$, and the winding of relay $K^1$ to terminal $o$. Energization of relay $K^1$ causes a circuit to be completed for energizing relay $K^{K1}$, this circuit passing from battery $zz$ over conductor $c$, through the winding of relay $K^{K1}$, valve $v^{12}$, conductor 340, front point of contact $312^{K1}$, and contact $311^{Q1}$ back to battery $zz$. Relay $K^{K1}$, upon becoming energized, completes a circuit for energizing relay $Z^1$, passing from terminal $x$, through contacts $313^{I1}$ and $315^{KK1}$, and the winding of relay $Z^1$ to terminal $o$. Relay $Z^1$, upon becoming energized, causes the energization of relay $X^1$ by the circuit previously traced.

With relays $K^{K1}$ and $X^1$ energized as just described, and with relay $L^1$ deenergized due to the presence of a train between the location of signal $S^{1a}$ and the point E, a circuit for energizing call-on relay $ZZ^1$ will be completed, passing from terminal $x$, through contacts $313^{I1}$, $316^{KK1}$, $317^{X1}$, and $320^{L1}$, and the winding of relay $ZZ^1$ to terminal $o$. Relay $ZZ^1$, upon becoming energized, completes its stick circuit passing from terminal $x$, through contact 318 of relay $ZZ^1$, contact $319^{P1}$, contact $320^{L1}$, and the winding of relay $ZZ^1$ to terminal $o$. Energization of relay $ZZ^1$ causes the energization of relay $Y^{1c}$ and the operation of signal $S^{1c}$ to display the call-on indication as previously described.

A train, upon entering track section A—ii, causes the energization of communication relay $T^{T2}$, as already traced. Relay $T^{T2}$, upon becoming energized, causes track indicator lamp $e^2$ to become energized by a circuit passing from terminal $x$, through contact $339^{TT2}$ and lamp $e^2$ to terminal $o$.

We have described, for a few typical traffic movements, the operation of three forms of apparatus embodying our invention. From those descriptions of operation and from the preceding general description, operation of each of the three forms of apparatus for every other possible traffic movement will be readily understood by reference to the drawings.

Apparatus of each of three forms embodying our invention is shown for a layout including switches which can be arranged for eleven different routes. Traffic movements can be made in either direction over each of these routes. A separate switch control lever is provided for each single switch and for each pair of crossover switches. In the first form of apparatus, two signal levers are shown for controlling all the signals for governing traffic movements in both directions over these eleven routes. Each of these levers has a left reverse position for controlling signals for governing westbound traffic movements which we have assumed to be toward the left, as shown in the drawings. Each of these levers has also a right reverse position for controlling signals for governing eastbound traffic movements. In the modifications shown in Figs. 6, 7a and 7b, a signal lever is provided for each signal location. The levers associated with signals which provide a call-on indication have an upper or reverse position for controlling the usual signal indications, and have a lower or call-on position for controlling the call-on indication.

In the forms of apparatus shown in Figs. 6, 7a and 7b, only one indicator lamp is associated with each switch and signal lever. Each of these lamps is enclosed by the associated lever, and is controlled to at times display a steady light and to at other times display a flashing light, in order to differentiate between indications.

The switch control circuits for each of the three forms of apparatus are so arranged as to prevent switch control storage, that is, if a switch lever is moved to a position for causing its switch to be operated while other traffic conditions prevent such an operation of the switch, the switch cannot subsequently be operated without a further movement of the switch lever when such other traffic conditions permit operation of the switch. During the time that the various traffic conditions prevent operation of the switch, the polarized switch control relay is retained energized in its last previous direction of energization by a polarized stick circuit.

For each of the three forms of apparatus, the circuits are so arranged that a mistaken operation of a switch lever for causing an operation of a switch in a route for which a signal is indicating proceed will not cause the signal to be put to the stop condition.

With each of the three forms of apparatus, the energization of a signal lock relay in series with a route relay prevents both the possibility of the indication of a clear signal being changed to a stop indication, and the clearing of an opposing signal, if the control lever for the opposing signal is reversed while the control lever for the first signal is in the position for causing the first signal to display the proceed indication.

In interlocking plants which are equipped with mechanically interlocked levers, electrically operated signals are commonly controlled by a circuit network which is somewhat similar to the circuit network shown in Fig. 5. Interlocking of signal controls is accomplished by the mechanical interlocking between signal levers in interlocking plants which embody mechanical interlocking, whereas in apparatus embodying our invention, an additional circuit network, shown in Fig. 3, provides interlocking between signal controls. The two circuit networks shown in Figs. 3 and 5 of the accompanying drawings serve as a check upon each other, whereas in interlocking plants which embody mechanical interlocking, the usual signal network circuits and the mechanical interlocking between signal levers serve as a check upon each other.

Group releasing of the approach locking relays is provided by the use of one time release, which may be of the clockwork type, together with two slow releasing relays. The time release is provided with contacts which close after a given time interval for controlling the approach locking relays for slow speed signals, and is provided with contacts having a longer period of closing for controlling the approach locking relays associated with high speed signals.

One modification of apparatus embodying our invention is shown having communication circuits for reducing the number of control and indication conductors between the point of control and the switch and signal locations. Lever repeater relays at the control point are repeated at the switch and signal locations by relays which are controlled by given communication circuits. The indication relays controlled by the apparatus at the switch and signal locations are repeated at the control point by relays which are controlled over other communication circuits.

Although we have herein shown and described only three forms of interlocking control apparatus embodying our invention, it is understood that various changes and modifications may be made therein within the scope of the appended claims without departing from the spirit and scope of our invention.

Having thus described our invention, what we claim is:

1. In combination, a railway track switch, a lever having a normal contact closed when said lever is in its normal position and having a reverse contact closed when said lever is in a reverse position, a normal control stick relay, a reverse control stick relay, a pickup circuit for said normal control stick relay including said normal contact, a stick circuit for said normal control stick relay including a back contact of said reverse control stick relay, a pickup circuit for said reverse control stick relay including said reverse contact, a stick circuit for said reverse control stick relay including a back contact of said normal control stick relay, a locking stick relay, a polarized control relay, a traffic contact controlled by traffic conditions adjacent said switch, a pickup circuit for said locking stick relay including said traffic contact in series with a front contact of said normal control stick relay and a normal polar contact of said polarized relay or in series with a front contact of said reverse control stick relay and a reverse polar contact of said polarized relay, a stick circuit for said locking stick relay including said traffic contact, normal and reverse operating circuits for said polarized relay controlled by said normal and reverse control stick relays respectively and including a front contact of said locking stick relay, normal and reverse stick circuits for said polarized relay including a back contact of said locking stick relay, and means controlled by normal and reverse polar contacts of said polarized relay for operating said switch to normal and reverse positions respectively.

2. In combination, a railway track switch, a polarized control relay, manually controllable means for energizing said relay by current of normal or of reverse polarity, a polarized indication relay, means controlled by said switch for energizing said indication relay by current of normal or of reverse polarity according as said switch is in its normal or its reverse position respectively, a normal indication relay, an energizing circuit for said normal indication relay including a normal polar contact of said polarized indication relay and a front neutral contact as well as a normal polar contact of said polarized control relay, a reverse indication relay, an energizing circuit for said reverse indication relay including a reverse polar contact of said polarized indication relay and a front neutral contact as well as a reverse polar contact of said polarized control relay, indication means controlled by said normal and reverse indication relays, and means controlled by normal and reverse polar contacts of said polarized control relay for operating said switch to its normal and reverse positions respectively.

3. In combination, a railway track switch, a lever having a normal and a reverse position, a locking stick relay, a traffic contact controlled by traffic conditions adjacent said switch, a polarized control relay, a normal contact so controlled by said lever as to be closed when said lever is in its normal position, a reverse contact so controlled by said lever as to be closed when said lever is in its reverse position, a pickup circuit for said locking stick relay including said traffic contact in series with said normal contact and a normal polar contact of said polarized relay or in series with said reverse contact and a reverse polar contact of said polarized relay, a stick circuit for said locking stick relay including said traffic contact, means controlled by said lever in its normal and reverse positions for energizing said polarized relay by current of normal or reverse polarity only if said locking stick relay is energized, and means controlled by said polarized relay for operating said switch to its normal or its reverse position according as said polarized relay is energized by current of normal or of reverse polarity respectively.

4. In combination, a railway track switch, a polarized control relay, manually controllable means for energizing said relay by current of normal or of reverse polarity, a polarized indication relay, means controlled by said switch for energizing said indication relay by current of normal or of reverse polarity according as said switch is in its normal or its reverse position respectively, a normal indication relay, an energizing circuit for said normal indication relay including a normal polar contact of said control relay and a normal polar contact of said polarized indication relay, a reverse indication relay, an energizing circuit for said reverse indication relay including a reverse polar contact of said control relay and a reverse polar contact of said polarized indication relay, and means controlled by a back contact of said normal indication relay and by a back contact of said reverse indication relay as well as by normal and reverse polar contacts of said polarized control relay for operating said switch to normal and reverse positions according as said polarized control relay is operated by current of normal or of reverse polarity respectively.

5. In combination, a railway track switch, a manually operable lever having a normal and reverse position, a polarized control relay, means controlled by said lever for energizing said polarized control relay in the normal direction when said lever is in its normal position and for energizing said polarized relay in the reverse direction when said lever is in its reverse position, a normal indication relay, means controlled by said switch and by said polarized control relay for energizing said normal indication relay when said switch is in its normal position and said polarized control relay is energized in the normal direction, a reverse indication relay, means controlled by said switch and by said polarized control relay for energizing said reverse indication relay when said switch is in its reverse position and said polarized control relay is energized in the reverse direction, means controlled by said polarized control relay and by said normal and reverse indication relays for operating said switch to its normal position if said polarized control relay is energized in the normal direction and said normal and reverse indication relays are deenergized, and means controlled by said polarized control relay and by said normal and reverse indication relays for operating said switch to its reverse position if said polarized control relay is energized in the reverse direction and said normal and reverse indication relays are deenergized.

6. In combination, a railway track switch, a manually operable lever having a normal and a reverse position, a normal control relay, means controlled by said lever for energizing said normal control relay when said lever is in its normal position only, a reverse control relay, means controlled by said lever for energizing said reverse control relay when said lever is in its reverse position only, a normal indication relay, means controlled by said switch and by said normal control relay for energizing said normal indication relay when said switch is in its normal position and said normal control relay is energized, a reverse indication relay, means controlled by said switch and by said reverse control relay for energizing said reverse indication relay when said switch is in its reverse position and said reverse control relay is energized, means controlled by said normal control relay and by back contacts of both said indication relays for operating said switch to its normal position, and means controlled by said reverse control relay and by back contacts of both said indication relays for operating said switch to its reverse position.

7. In combination, a railway track switch, a manually operable lever having a normal and a reverse position, a normal indication relay, means controlled by said switch and by said lever for energizing said normal indication relay when said switch and said lever are in their normal positions, a reverse indication relay, means controlled by said switch and by said lever for energizing said reverse indication relay when said switch and said lever are in their reverse positions, means controlled by said lever in its normal position and by back contacts of both said indication relays for operating said switch to its normal position, and means controlled by said lever in its reverse position and by back contacts of both said indication relays for operating said switch to its reverse position.

8. In combination, a railway track switch, a manually operable lever having a normal and a reverse position, a normal indication relay, means controlled by said switch and by said lever for energizing said normal indication relay when said switch and said lever are in their normal positions, a reverse indication relay, means controlled by said switch and by said lever for energizing said reverse indication relay when said switch and said lever are in their reverse positions, means controlled by said lever in its normal position and by back contacts of both said indication relays for operating said switch to its normal position, means controlled by said lever in its reverse position and by back contacts of both said indication relays for operating said switch to its reverse position, and means controlled by track circuit conditions adjacent said switch for at times removing said lever from control of said switch.

9. In combination, a railway track switch, a manually operable lever having a normal and a reverse position, a normal indication relay, means controlled by said switch and by said lever for energizing said normal indication relay when said switch and said lever are in their normal positions, a reverse indication relay, means controlled by said switch and by said lever for energizing said reverse indication relay when said switch and said lever are in their reverse positions, means controlled by said lever in its normal position and by back contacts of both said indication relays for operating said switch to its normal position, means controlled by said lever in its reverse position and by back contacts of both said indication relays for operating said switch to its reverse position, means controlled by track circuit conditions adjacent said switch for at times removing said lever from control of said switch, indication means for said lever comprising a normal and a reverse indication lamp as well as a traffic lamp, a circuit controlled by said lever and by said normal indication relay for lighting said normal lamp if said lever and said switch are in their normal positions, a circuit controlled by said lever and by said reverse indication relay for lighting said reverse lamp if said lever and said switch are in their reverse positions, and a circuit controlled by said track circuit conditions for lighting said traffic lamp if said lever is removed from control of said switch.

10. In combination, a railway track switch, a manually operable lever having a normal and a reverse position, a normal indication relay, means controlled by said switch and by said lever for energizing said normal indication relay when said switch and said lever are in their normal positions, a reverse indication relay, means controlled by said switch and by said lever for energizing said reverse indication relay when said switch and said lever are in their reverse positions, means controlled by said lever in its normal position and by back contacts of both said indication relays for operating said switch to its normal position, means controlled by said lever in its reverse position and by back contacts of both said indication relays for operating said switch to its reverse position, indication means for said lever comprising a normal and a reverse indication lamp, a circuit controlled by said lever and by said normal indication relay for lighting said normal lamp if said lever and said switch are in their normal positions, and a circuit controlled by said lever and by said reverse indication relay for lighting said reverse lamp if said lever and said switch are in their reverse positions.

11. In combination, a stretch of railway track, a signal for governing traffic movements from a given direction over said stretch, a second signal for governing traffic movements from a second direction over said stretch, a manually operable signal lever having a normal and a reverse position, means controlled by said lever for clearing said first signal when said lever is moved to its reverse position, signal control apparatus for at times clearing said second signal, indication means for said lever comprising a first and a second lamp, a circuit controlled by said lever in its reverse position if said signal control apparatus is not in condition for clearing said second signal, for lighting said first lamp until said first signal clears, and a circuit controlled by said signal control apparatus for lighting said second lamp if said signal control apparatus is in condition for clearing said second signal.

12. In combination, a section of railway track including a switch, a call-on signal for governing traffic movements over said section, a call-on stick relay, a stick locking relay, a manually operable device having a normal and a reverse position, a circuit including a front contact of said call-on relay and controlled by a reverse contact of said manually operable device for controlling said signal, a time element relay, a circuit including a back contact of said locking relay as well as a second contact controlled by said manually operable device and arranged to be closed at all times except when said manually operable device is in its reverse position for energizing said time element relay, a pickup circuit for said locking relay including said second contact and a front contact of said time element relay, a stick circuit for said locking relay including said second contact, a pickup circuit for said call-on relay including a reverse contact of said manually operable device, and a stick circuit for said call-on relay including a back contact of said stick locking relay.

13. In combination, a stretch of railway track including a switch, a call-on signal for governing traffic movements over said stretch, a call-on stick relay, a manually operable lever having a normal and a reverse position, a circuit controlled by a front contact of said call-on relay and by a reverse contact of said lever for controlling said signal, an approach locking relay, a manually controllable time release, a pickup circuit for said approach locking relay controlled by said release and by said lever for energizing said relay upon the lapse of a measured time interval after said lever is moved away from its reverse position, a stick circuit for said approach locking relay controlled by said lever in its normal position, a pickup circuit for said call-on relay controlled by a reverse contact of said lever, and a stick circuit for said call-on relay controlled by a back contact of said approach locking relay.

14. In combination, a stretch of railway track including a switch, a signal adjacent an entrance end of said stretch for governing traffic movements over said stretch, an approach locking relay, a manually operable lever having a normal and a reverse position, a time release, means for at times operating said release, a pickup circuit for said relay controlled by said release and by said lever for energizing said relay upon the lapse of a measured time interval after said lever is moved away from its reverse position, a stick circuit controlled by said lever for continuing the energization of said relay while said lever is in its normal position, a route locking relay, a pickup circuit for said route locking relay controlled by a front contact of said approach locking relay and by track circuit conditions in said stretch, a stick circuit for said route locking relay controlled by a front contact of said approach locking relay, a circuit controlled by said lever in its reverse position and including a back contact of said route locking relay for clearing said signal, and means including a front contact of said route locking relay for controlling said switch.

15. In combination, a stretch of railway track including a switch, a signal adjacent an entrance end of said stretch for governing traffic movements over said stretch, a manually operable lever having a normal and a reverse position, a route locking relay, a signal circuit controlled by said lever and including a back contact of said route locking relay for clearing said signal when said lever is moved to its reverse position, a pickup circuit for said route locking relay controlled by track circuit conditions between said signal and said switch and including a contact controlled by said signal circuit for energizing said relay when said signal circuit is deenergized and the track is clear between said signal and said switch, a stick circuit controlled by said lever for retaining said relay in its energized condition while said lever is in its normal position, and means including a front contact of said route locking relay for controlling said switch.

16. In combination, a stretch of railway track including a switch, a signal for governing traffic movements over said stretch, a manually operable lever having a normal and a reverse position, an approach locking relay, a normally unwound manually operable clockwork time release having a first contact which is closed only when said release is fully wound up and having a second contact which becomes closed upon the lapse of a given period of time after said release has started to unwind as well as having a third contact which becomes closed upon the lapse of a measured period of time after said second contact closes, a signal circuit controlled by said lever to be closed when said lever is in its reverse position only for causing said signal to clear, a slow release relay, a circuit including said first time release contact and a back contact of said approach locking relay as well as a back contact controlled by said signal circuit for energizing said slow release relay, a pickup circuit for said approach locking relay including said second time release contact and a front contact of said slow release relay as well as a back contact controlled by said signal circuit and also a contact which becomes closed when said stretch is arranged for a slow speed traffic movement, a second pickup circuit for said approach locking relay including said third time release contact and a front contact of said slow release relay as well as controlled by a back contact which is controlled by said signal circuit, a stick circuit for said approach locking relay controlled by a back contact which is controlled by said signal circuit, and control means for said switch energized only when said approach locking relay is energized.

17. In combination, a plurality of railway tracks interconnected by switches to form a plurality of routes, signals located adjacent said tracks for governing traffic movements over said routes, miniature representations of said tracks and switches and signals so placed relatively to each other as to form an approximate model of the arrangement of said tracks and switches and signals, a manually operable switch lever for each single switch and for each pair of crossover switches mounted on said model adjacent the representation of its single switch or its pair of crossover switches respectively, a switch indicator light inclosed by each of said switch levers, a manually operable signal lever mounted on said model adjacent each signal representation, a signal indicator light inclosed by each of said signal levers, means controlled by each of said switch levers for operating its switch or pair of switches, a signal relay controlled by each signal lever for controlling its signal, means controlled by each switch lever and by its switch as well as by another traffic condition for causing the corresponding switch lever light to distinctively indicate the various conditions of the associated switch and its control apparatus, and means controlled by each signal lever and by its signal relay for causing the corresponding signal lever light to distinctively indicate the various conditions of the associated signal and its control apparatus.

18. In combination, a railway track switch, a switch lever, means controlled by said switch lever when operated to its normal and reverse positions for operating said switch to normal and reverse positions respectively, an indication lamp, means controlled by said lever and by said switch for periodically lighting said lamp when said switch fails to correspond in position with said lever, a signal for governing traffic movements over said switch, signal control means operable for clearing said signal, and means controlled by a train adjacent said switch and by said signal control means for at times constantly lighting said lamp.

19. In combination, a stretch of railway track, a signal for governing traffic movements from a given direction over said stretch, a second signal for governing traffic movements from a second direction over said stretch, a manually operable signal lever having a normal and a reverse position, means controlled by said lever for clearing said first signal when said lever is moved to its reverse position, signal control apparatus for at times clearing said second signal, an indication lamp, means controlled by said lever when in its reverse position for periodically lighting said lamp when said first signal indicates stop, and means controlled by said signal control apparatus when in condition for clearing said second signal to constantly light said lamp.

20. In combination, a stretch of railway track, a signal for governing traffic movements from a given direction over said stretch, a second signal for governing an opposing traffic movement over said stretch, a manually operable lever, a circuit controlled by said lever for clearing said first signal, control apparatus for at times clearing said second signal only if said first signal is controlled to indicate "stop", an indication device associated with said lever, means controlled by said lever and by said circuit for at times periodically energizing said indication device, and means controlled by said control apparatus for constantly energizing said indication device when said second signal is controlled to display a proceed indication.

21. A system of interlocking control for a stretch of railway track comprising a plurality of track switches which can be arranged to form one or more routes through said stretch at any given time, a plurality of signals for directing traffic movements over said routes, a manually controllable switch lever for each single switch and for each pair of crossover switches, a switch lock relay associated with each of said switch levers, a plurality of manually controllable signal levers each of which has a normal position and one or more reverse positions, an approach locking relay associated with each reverse position of each signal lever, a route locking relay associated with each of said approach locking relays, a polarized switch relay for each switch lever, circuits controlled by each switch lever in its normal and reverse positions for energizing its associated polarized switch relay in the normal or the reverse directiton respectively if and only if the associated switch lock relay is energized, a pickup circuit for each switch lock relay controlled by front contacts of the approach locking relay or the route locking relay for each route in which the associated switch is included and energized only if the track is clear adjacent the switch and if its switch lever corresponds in position with the direction of energization of its polarized switch relay, a stick circuit which is the same as the pickup circuit for each switch lock relay except that it is independent of the position of the switch and the energization of the polarized switch relay, pickup and stick circuits for energizing each approach locking relay only if its signal lever is not in the associated reverse position, pickup and stick circuits for each route locking relay controlled by the associated approach locking relay and by track circuit conditions in its route, means controlled by normal and reverse polar contacts of each polarized switch relay for operating the associated switch or pair of switches to normal and reverse positions respectively, and a clearing circuit for each signal controlled by its lever in a corresponding reverse position and by back contacts of its approach locking relay and of all the switch locking relays for its route and also of the associated route locking relay.

22. In a system of interlocking control, a stretch of railway track including one or more switches, a plurality of signals for governing traffic movements over said stretch, a manually controllable contact for each signal and each of said contacts having a normal and a reverse position, an approach locking relay for each signal, pickup and stick circuits for energizing each approach locking relay only if the control contact for its signal is in the normal position, a route locking relay associated with each approach locking relay, circuits controlled by the associated approach locking relay and by track circuit conditions in one or more given routes for energizing each route locking relay, a switch lock relay for each single switch and for each pair of crossover switches, pickup and stick circuits for each switch lock relay energizable only if an approach locking relay or a route locking relay is energized for each route in which the associated switch is included, manually operable means for each switch or pair of crossover switches for causing operation of the associated switch or pair of crossover switches to normal and reverse positions only if the associated switch lock relay is energized, and a clearing circuit for each switch controlled by its manually controllable contact in the reverse position and by back contacts of its approach locking relay and of all the switch lock relays for its route and also of the associated route locking relay.

23. In combination, a railway track switch, a manually controllable switch lever, a polarized switch control relay, means controlled by normal and reverse polar contacts of said polarized switch control relay for operating said switch to normal and reverse positions respectively, a switch locking relay, circuits controlled by said switch lever in its normal and reverse positions for energizing said polarized switch control relay in the normal and the reverse direction respectively if and only if said switch locking relay is energized, a stick circuit for said switch locking relay controlled by track circuit conditions adjacent said switch, and a pickup circuit for said switch locking relay controlled by track circuit conditions adjacent said switch and energizable only if the position of the switch lever agrees with the direction of energization of the polarized switch control relay for preventing switch control storage.

24. In combination, a railway track switch, a signal for governing traffic movements over said switch, a manually controllable switch lever, a normal switch relay, a reverse switch relay, a polarized switch relay, circuits controlled by said switch lever in its normal and reverse positions for energizing said normal and reverse switch relays respectively, circuits controlled by said normal and reverse switch relays for energizing said polarized switch relay in the normal and reverse directions respectively, means controlled by said polarized switch relay when energized in the normal and reverse directions for operating said switch to its normal and reverse positions respectively, a manually controllable signal lever having a normal and a reverse position, a signal circuit controlled by said signal lever in its reverse position and by said switch in a given position for clearing said signal, and means controlled by said signal lever for removing said normal and reverse switch relays from control of said polarized switch relay when said signal lever is in its reverse position and thereby preventing operation of said switch lever from causing said signal to display a stop indication.

25. In an interlocking control system for a railway track layout comprising a plurality of interconnected traffic routes, a plurality of signals for governing train movements over said routes, a plurality of manually operable signal control levers, a plurality of route relays, a plurality of signal lock relays, a route check network comprising a plurality of interconnected circuits each of which is supplied with current from a given source and is controlled by a corresponding signal control lever and includes in series a route relay at one end of the circuit and a signal lock relay adjacent the other end of the circuit, means controlled by each route relay for clearing a corresponding signal, and means controlled by each signal lock relay for preventing energization of the route relay for clearing an opposing signal as well as for preventing the operation of a lever for an opposing signal from causing the first signal to display a stop indication.

26. In combination, a railway track switch, a signal for governing high speed traffic movements over said switch, a second signal for governing low speed traffic movements over said switch, manually controlled means for at times clearing each of said signals, an approach locking relay, a pickup circuit for energizing said relay if and only if both said signals are controlled to indicate stop and if there is no approaching train within a given distance in the rear of said signals, a stick circuit for said relay closed only if both said signals are controlled to indicate stop, a manually controllable time releasing device having a normally open first contact and normally closed second and third contacts so arranged that the second and third contacts will open when the device is operated to close the first contact and that the second contact will again close only upon the lapse of a measured period of time after the first contact opens and the third contact will again close only upon the lapse of a further measured period of time after the second contact closes when the device is being returned to its normal condition, a slow release relay controlled by said first contact, a second pickup circuit for said approach locking relay controlled by said second contact and by said slow release relay, a third pickup circuit for said approach locking relay controlled by said third contact, and means controlled in part by said approach locking relay for operating said switch only when said approach locking relay is energized.

27. In combination, a railway track switch, a signal for governing high speed traffic movements over said switch, a second signal for governing low speed traffic movements over said switch, manually controllable means for at times clearing each of said signals, a stick locking relay, a stick circuit for said relay closed only if both said signals are controlled to indicate stop, a manually controllable time releasing device having a normally closed first contact and a normally closed second contact so arranged that both said contacts will open when said device is operated to a reverse position and that the first contact will again close only upon the lapse of a measured period of time after said device leaves its reverse position and the second contact will again close only upon the lapse of a further measured period of time after said first contact closes when the device is being returned to its normal position, a pickup circuit for said stick locking relay controlled by said first contact and closed when said second signal is returned from its clear position to its stop position, a second pickup circuit for said stick locking relay controlled by said second contact and closed when said first signal is returned from its clear position to its stop position, and means controlled in part by said stick locking relay for operating said switch only when said stick locking relay is energized.

28. A system of interlocking control for a stretch of railway track comprising a plurality of track switches which can be arranged to form one or more routes through said stretch at any given time, a plurality of signals including call-on signals for directing traffic movements over said routes, a manually controllable switch lever for each single switch and for each pair of crossover switches, one or more manually controllable signal levers for said plurality of signals each having a reverse position and some having also a call-on position, a normal switch relay for each switch lever controlled by its lever in the normal position, a reverse switch relay for each switch lever controlled by its lever in the reverse position, a signal relay controlled by each signal lever in its reverse position, a call-on relay controlled by the call-on position of each signal lever which has a call-on position, a normal switch lever communication relay for each normal switch relay, a reverse switch lever communication relay for each reverse switch relay, a pair of conductors comprising a switch conductor and a common conductor for each pair of normal and reverse switch relays, a pair of asymmetric units for each pair of switch lever communication relays, means controlled by each pair of switch relays and by the corresponding pair of asymmetric units for selectively controlling each of a corresponding pair of normal and reverse switch lever communication relays over the associated pair of conductors, a pair of conductors comprising a signal conductor and one of said common conductors for each signal relay and the associated call-on relay, a pair of signal and call-on communication relays for each signal relay and the associated call-on relay, a pair of asymmetric units for each pair of signal and call-on communication relays, means controlled by each pair of signal and call-on relays and by the corresponding pair of asymmetric units for selectively controlling the associated pair of communication relays over the corresponding pair of conductors, means controlled by each pair of switch lever communication relays for operating the corresponding switch to normal and reverse positions, and means controlled by each signal and call-on communication relay for clearing a corresponding signal.

29. A system of interlocking control for a stretch of railway track comprising a plurality of track switches which can be arranged to form one or more routes through said stretch at any given time, a plurality of signals for directing traffic movements over said routes, a manually controllable switch lever for each single switch and for each pair of crossover switches, one or more manually controllable signal levers for said plurality of signals each having one or more reverse positions, a normal switch relay for each switch lever, a reverse switch relay for each switch lever, a pair of switch conductors for each switch lever, a pair of asymmetric units for each switch lever, means controlled by each switch lever in its normal and reverse positions and by the corresponding pair of asymmetric units for selectively controlling each of the corresponding pair of switch relays over the associated pair of conductors, a pair of signal conductors for each signal lever, a signal relay for each reverse position of each signal lever, a pair of asymmetric units for each signal lever, means controlled by each reverse position of each signal lever having two reverse positions and by the corresponding pair of asymmetric units for selectively controlling the associated two signal relays over the associated pair of signal conductors, means controlled by each pair of normal and reverse switch relays for operating the corresponding switch to its normal and reverse positions, and means controlled by each pair of signal relays for clearing the associated signals.

30. In combination, stick locking apparatus for a plurality of parallel railway traffic routes each of which is provided with switches and with signals for governing traffic movements in both directions, said stick locking apparatus comprising a stick locking relay for each direction of traffic movement over each of the parallel routes and a pickup circuit for each of said stick locking relays which is closed by the entrance of a train into the associated traffic route as well as a stick circuit for each of said stick locking relays controlled in conjunction with an associated signal for retaining its stick locking relay in the energized condition as long as the associated signal continues to indicate stop, group releasing apparatus for said stick locking apparatus comprising a manually controllable time releasing device as well as two slow release relays one for each direction of traffic movement each controlled by the time releasing device to become energized if one of the stick locking relays for the same direction of traffic movements is deenergized and also means controlled by each of said slow releasing relays and by said time releasing device for energizing each of said stick locking relays upon the lapse of a given minimum period of time after the associated signal has been controlled to indicate stop, manually controllable switch operating apparatus for said switches controlled in part by said stick locking relays, and manually controllable means for at times clearing each of said signals.

31. In combination, approach locking apparatus for a plurality of parallel railway traffic routes each of which includes one or more switches and is provided with signals for governing traffic movements in both directions, said approach locking apparatus comprising an approach locking stick relay for each direction of traffic movement over each of the parallel routes and means for energizing each of said approach locking relays if an associated signal indicates stop while there is no train approaching within a given distance of said associated signal as well as means for retaining each of said approach locking relays in the energized condition as long as the associated signal continues to indicate stop, group releasing apparatus for said approach locking apparatus comprising a manually controllable time releasing device as well as two slow release relays one for each direction of traffic movement and each controlled by the time releasing device and also means controlled by each of said slow release relays for energizing each of said approach locking relays upon the lapse of a given minimum period of time after the associated signal has been controlled to indicate stop, manually controllable apparatus controlled in part by said approach locking apparatus for operating said switches, and manually controlled means for at times clearing said signals.

32. In combination, a plurality of parallel railway traffic routes each of which is provided with one or more switches and with a signal for governing traffic movements through the route, switch locking apparatus for said routes comprising a stick relay for each of the parallel routes and means controlled by given traffic conditions for energizing each of said stick relays if an associated signal indicates stop as well as means for retaining each of said stick relays in its energized condition independently of said given traffic conditions as long as an associated signal continues to indicate stop, group releasing apparatus for said switch locking apparatus comprising a manually controllable time releasing device as well as a slow release relay controlled by the time releasing device and by a back contact of an associated stick relay and also means controlled by said slow release relay for energizing each of said stick relays upon the lapse of a given minimum period of time after the associated signal has been controlled to indicate stop, manually controllable apparatus controlled in part by said switch locking apparatus for operating said switches, and manually controllable means for at times clearing said signals.

33. In a remote control system, a railway track switch, a two-position control lever, a polarized relay, a lock relay, a traffic contact closed only under conditions favorable for the operation of the switch, a circuit for operating said polarized relay to a position corresponding to that of said lever including a front contact of said lock relay, a circuit for maintaining said polarized relay energized in its last operated position including its own polar contacts and a back contact of said lock relay, a circuit for picking up said lock relay including said polar contacts and said traffic contact and closed only when the polarized relay and its control lever occupy corresponding positions, a stick circuit for said lock relay including its own front contact and said traffic contact, and means controlled by the polarized relay when operated to move the switch to a corresponding position, said means being effective to maintain the switch in such position irrespective of traffic conditions as long as the polarized relay remains energized.

34. In a remote control system, a railway track switch, a two position control lever, a polarized relay, an operating circuit for said relay including contacts controlled by said lever and closed under favorable traffic conditions for operating said relay to a position corresponding to the position of said lever, a holding circuit for maintaining said relay energized under unfavorable traffic conditions including its own polar contacts, means controlled by the polarized relay effective only when the relay is energized to move the switch to a corresponding position, and means for preventing the operating circuit for said relay from becoming effective unless the lever is operated when traffic conditions are favorable, comprising a circuit including polar contacts of said polarized relay and contacts controlled by said lever, said circuit being closed only when the polarized relay and its control lever occupy corresponding positions.

35. In combination with a railway track switch, a two-position switch lever, a two-position switch control relay, means controlled by said relay and rendered effective when the relay is operated from one position to the other to operate the track switch to a corresponding position, switch locking means for at times preventing operation of the track switch, a stick relay, a pickup circuit for said stick relay closed only when said locking means is released and the switch lever occupies a position corresponding to the last-operated position of the track switch, a stick circuit for maintaining said stick relay energized if and only if said locking means is released, and a control circuit controlled by said lever and including front contacts of said stick relay for operating said switch control relay to a position corresponding to the position of said lever.

36. In combination with a railway track switch, a two-position switch lever, a two-position switch control relay, means controlled by said relay and rendered effective when the relay is operated from one position to the other to operate the track switch to a corresponding position, switch locking means for at times preventing operation of the track switch, a stick relay, a pickup circuit for said stick relay closed only when said locking means is released and the switch lever occupies a position corresponding to the last-operated position of said switch control relay, a stick circuit independent of said switch lever and said switch control relay for maintaining said stick relay energized only as long as said locking means is released, and a control circuit for said switch control relay controlled by said lever and including front contacts of said stick relay for operating said control relay to a position corresponding to the position of said lever and for maintaining said relay in its operated position as long as said stick relay is energized.

37. In combination with a railway track switch, a two-position switch lever, a two-position switch control relay, means controlled by said relay and rendered effective when the relay is operated from one position to the other to operate the track switch to a corresponding position, switch locking means for at times preventing operation of the track switch, a stick relay, a pickup circuit for said stick relay closed only when said locking means is released and the switch lever occupies a position corresponding to the last-operated position of said switch control relay, a stick circuit independent of said switch lever and said switch control relay for maintaining said stick relay energized only as long as said locking means is released, a control circuit for said switch control relay effective to energize the switch control relay in a position corresponding to the position of said lever when said stick relay is energized, and a holding circuit for said switch control relay effective to energize it in its last operated position when said stick relay is de-energized.

38. In combination with a railway track switch, a two-position switch control device, a two-position switch control relay, means controlled by said relay and rendered effective when the relay is operated from one position to the other to operate the track switch to a corresponding position, switch locking means for at times preventing operation of the track switch, a control circuit for said switch control relay controlled by said control device and effective only when said switch locking means is released to energize the switch control relay in a position corresponding to the position of said device, and means for automatically closing said control circuit when said locking becomes released effective only if said switch control device and said switch control relay occupy corresponding positions.
39. In combination with a railway track switch, a polarized switch control relay, means controlled by said relay and rendered effective when the relay is operated from one position to the other to operate the track switch to a corresponding position, switch locking means for at times preventing operation of the track switch, a stick relay, a pole changer, a control circuit for said polarized relay including contacts of said pole changer and front contacts of said stick relay, a pickup circuit for said stick relay closed only when said switch locking means is released and including corresponding contacts of said pole changer and said polarized relay, a stick circuit for said stick relay controlled only by said locking means, and manually operable means for controlling said pole changer.
   40. In combination with a railway track switch, a polarized switch control relay, means controlled by said relay and rendered effective when the relay is operated from one position to the other to operate the track switch to a corresponding position, switch locking means for at times preventing operation of the track switch, a stick relay, a pole changer, a control circuit for said polarized relay including contacts of said pole changer and front contacts of said stick relay, a pickup circuit for said stick relay closed only when said switch locking means is released and the position of said pole changer corresponds to the last operated position of the track switch, a stick circuit for said stick relay controlled only by said locking means, and manually operable means for controlling said pole changer.
   41. In combination with a railway track
   switch, a polarized switch control relay, a switch machine for operating the track switch, operating circuits for the switch machine including neutral and polar contacts of said relay for operating the track switch to a position corresponding to that of the control relay and for maintaining it in its operated position, switch locking means for at times preventing operation of the switch including a stick relay, an electrically controlled pole changer, a control circuit for said polarized relay including the contacts of said pole changer and front contacts of said stick relay, a holding circuit for said polarized relay including its own polar contacts and back contacts of said stick relay, a manually operable lever for controlling said pole changer, and means preventing said stick relay from becoming energized in response to a release of the switch locking unless the pole changer is in such position as to supply current to the polarized relay of the same polarity as that supplied to said relay over its holding circuit.
   42. In a remote control system, a railway track switch, a two-position control lever, a polarized relay, a lock relay, a traffic contact closed only under conditions favorable for the operation of the switch, a circuit including a front contact of said lock relay for operating said polarized relay to a position corresponding with said lever, a circuit for maintaining said polarized relay in its last operated position including polar contacts of the polarized relay and a back contact of said lock relay, a circuit for picking up said lock relay including polar contacts of said polarized relay and said traffic contact and closed only when the polarized relay and its lever agree in position, a stick circuit for said lock relay including its own front contact and said traffic contact, and means controlled by the polarized relay when reversed to move the switch to a corresponding position.
   43. In a centralized traffic controlling system for railroads, a power operated track switch, a switch control relay for controlling the power operation of said track switch, a switch control lever, a lock contact open for the passage of traffic over said track switch and closed when it is safe to operate said track switch, and circuit means including said lock contact for controlling said switch control relay only with said lock contact closed and only provided said switch control relay and said switch control lever have been in corresponding positions following an opening of said lock contact.
   44. In a traffic control system for railroads, a stretch of railway track, a plurality of track switches in said stretch, signals for governing traffic in opposite directions over said stretch, two control relays for governing the movement of traffic by said signals in both directions over said stretch; normally closed circuits having current flowing therein when said switches are free to be operated, means for opening certain of said circuits under control of one of said relays when the same is operated to clear one of said signals, means for opening certain other of said circuits under control of the other of said relays when it is operated to clear another of said signals; and a circuit for the particular signal which must be cleared to govern traffic in a direction determined by the control relay operated to govern traffic over the route determined by the position of said switches prior to the operation of such control relay and which circuit includes back contacts of relays included in the first specified circuits under control of the actuated control relay.
45. In combination, a power-operated track switch, a switch control lever for governing the power operation of said track switch, signals for governing traffic over said track switch, a signal control lever for clearing said signals when operated to a clearing position, a single winding lock relay having a front contact for allowing said switch control lever to govern said track switch only when such contact is closed, a pick-up circuit for said lock relay capable of being closed only when said switch control lever is in a position corresponding to the position of said track switch, a stick circuit for said lock relay capable of being closed independently of the position of said track switch, and means for opening both said pick-up and stick circuits whenever said signal lever is in a clearing position and so long as any one of said signals is clear.
   46. In combination, a power operated track switch, a switch control lever for governing the operation of said track switch, signals for governing traffic over said track switch, a signal control lever for clearing said signals when operated to a signal clearing position, a single wound lock relay having a front contact for allowing said switch control lever to govern said track switch only when said contact is closed, a pick-up circuit for said lock relay capable of being closed only when said switch control lever is in a position corresponding to the position of said track switch, a stick circuit for said lock relay capable of being closed independently of the position of said track switch, means for opening both said pick-up and said stick circuits whenever said signal lever is in a clearing position and so long as any one of said signals is clear whereby said lock relay is deenergized, and means visually indicating that said lock relay is deenergized.

47. In combination; a switch machine for operating a railway track switch; a polar neutral relay for controlling said switch machine to a position corresponding to the polar position assumed by said relay; signals governing traffic over said switch; a signal control relay for when energized permitting clearing of one of said signals; a lock relay energized only if all of said signals assume the stop indicating position, the track section with which said switch is associated is unoccupied and said signal control relay assumes the retracted position; manually controllable control means for applying current of positive or current of negative polarity to said polar-neutral relay; a pickup circuit for said polar-neutral relay including a front contact of said lock relay and said control means in series; and a stick circuit for said polar-neutral relay including a back contact of said lock relay, a front neutral contact and a polar contact of said polar-neutral relay all in series; whereby if, while said polar-neutral relay is energized by its stick circuit, said polar contacts are accidentally displaced to the opposite position said neutral contact will be opened while the magnetic flux of said polar-neutral relay passes through zero, and will remain open, deenergizing said polar-neutral relay.

48. In combination; a switch machine for operating a railway track switch; a polar-neutral relay for controlling said switch machine to a position depending on the polar position assumed by said relay; signals governing traffic over said switch; a signal control relay for when energized permitting clearing of one of said signals; a lock relay energized only if all of said signals assume the stop indicating position, the track section with which said switch is associated is unoccupied and said signal control relay assumes the retracted position; manually controllable control means for applying current of positive or current of negative polarity to said polar-neutral relay; a pick-up circuit for said polar-neutral relay including a front contact of said lock relay and said control means in series; and a stick circuit for said polar-neutral relay including a back contact of said lock relay, a front neutral contact and a polar contact of said polar-neutral relay all in series; whereby if said polar contact does not respond to a change of polarity of current applied to said pick-up circuit, the dropping of said lock relay results in deenergization of said polar-neutral relay, because current of the opposite polarity will flow for a moment in the stick circuit and winding of said polar-neutral relay, causing the magnetic flux in the neutral armature to pass through zero and causing opening of said front neutral contact and opening of said stick circuit.

49. In combination; a section of track including a track switch; a switch machine for controlling said track switch; signals for governing traffic over said section; a polar neutral switch control relay for controlling the operation of said switch machine to normal and reverse positions in accordance with the normal and reverse positions respectively of said switch control relay, a signal control relay for selectively preparing the circuits for said signals; a lock relay for controlling the locking and unlocking of said switch machine in accordance with the inactive and active positions respectively of said lock relay; means for permitting said lock relay to assume its active position only when none of said signals are energized, said track section is unoccupied and said signal control relay is out of position for energizing any of said signals; manually controllable means including a contact of said lock relay in its active position for actuating the polar and neutral contacts of said switch control relay; and means including said polar and neutral contacts and said lock relay in its inactive position for maintaining said polar and neutral contacts in the positions to which they were actuated by said manually controllable means.

50. In combination; a section of track including a track switch; a switch machine for controlling said track switch; signals for governing traffic over said section; a polar neutral switch control relay for controlling the operation of said switch machine to normal and reverse positions in accordance with the normal and reverse positions respectively of said switch control relay; a signal control relay for selectively preparing the circuits for said signals; a lock relay for controlling the locking and unlocking of said switch machine in accordance with the inactive and active positions respectively of said lock relay; means for permitting said lock relay to assume its active position only when none of said signals are energized, said track section is unoccupied and said signal control relay is out of position for energizing any of said signals; manually controllable means including a contact of said lock relay in its active position for actuating the polar and neutral contacts of said switch control relay; means including said polar and neutral contacts and said lock relay in its inactive position for maintaining said polar and neutral contacts in the positions to which they were actuated by said manually controllable means; and means controlled by said switch control relay for completing said selectively prepared circuits.

51. In combination, a power switch machine for operating a railroad track switch, a signal for governing traffic over said track switch, a switch control relay of the polar neutral type for governing the operation of said power switch machine, a switch control line circuit extending from a central office to said switch control relay, a stick circuit for said switch control relay including a polar and a neutral contact of said switch control relay, locking means for shifting said switch control relay from its said control line circuit to its said stick circuit whenever said signal is to be cleared, and means manually controlled for clearing said signal, said means being effective only when said switch control relay is energized.

52. In combination, a power switch machine for operating a railroad track switch, a signal for governing traffic over said track switch, a switch control relay of the polar neutral type for controlling the operation of said switch machine, a line circuit for said switch control relay extending from a central office and having one polarity or the other manually applied thereto, a stick circuit for said switch control relay including a polar contact of such relay, locking means effective whenever said signal is to be cleared for shifting the control of the energization of said switch control relay from its said line circuit to its said stick circuit, and manually governable means for clearing said signal only when said switch control relay is energized.

53. In combination, a power switch machine for operating a railroad track switch, a signal for governing traffic over said track switch, a switch control relay of the polar neutral type for governing the operation of said power switch machine, a switch control line circuit extending from a central office to said switch control relay and having one polarity or the other manually applied thereto, a local stick circuit for said switch control relay including a polar and a neutral contact of said switch control relay, signal control means for clearing said signal when manually conditioned, locking means for shifting the control of the energization of said switch control relay from its said line circuit to its said stick circuit whenever said signal control means is manually conditioned to clear said signal and circuit means governed by said signal control means for clearing said signal only when said locking means has shifted the control of said switch control relay to its said stick circuit and only when said switch control relay is energized.

54. In combination, a power switch machine for operating a railroad track switch, a signal for governing traffic over said track switch, normally energized switch control relay for controlling the operation of said track switch to normal and reverse positions when energized with one polarity or the other as manually selected at a remote point, signal control means capable of assuming clear and stop conditions for at times clearing said signal, locking means for preventing manual selection of the polarity for said switch control relay when said signal control means assumes a clear condition, stick circuit means for maintaining said switch control means energized whenever said signal is cleared or said signal control means is conditioned to clear said signal, and circuit means governed by said signal control means for clearing said signal only after said locking means and said stick circuit means have been rendered effective.

55. In combination, a power switch machine for operating a railroad track switch; a signal for governing traffic over said track switch; normally energized switch control means for controlling the operation of said track switch to normal and reverse positions, said switch control means being manually controlled from a remote point; signal control means capable of assuming clear and stop conditions; locking means for preventing manual control of said switch control means whenever said signal is cleared and whenever said signal control means is conditioned to clear said signal; stick circuit means for maintaining said switch control means energized whenever said locking means is effective; and circuit means governed by said signal control means for clearing said signal only when said locking means is effective and only providing said switch control means is energized.

56. In combination, a power switch machine for operating a railroad track switch to normal and reverse positions, a signal for governing traffic over said track switch, a switch control relay for governing the operation of said power switch machine to operate said track switch to normal and reverse positions in accordance with its distinctively energized condition, a control line circuit extending from a central office to said track switch and over which said control relay is distinctively energized, a stick circuit for said switch control relay for at times maintaining the distinctive energization of said switch control relay means, locking means for shifting the control of the distinctive energization of said switch control relay from said control line circuit to its said stick circuit whenever said signal is clear, and means manually controlled for clearing said signal, said means being effective only when said switch control relay is maintained distinctively energized by its said stick circuit.

57. In a centralized traffic control system for railroads, a track layout including a railway traffic governing device, a track diagram comprising a miniature representation of said track layout, a key for controlling said traffic governing device located in said diagram at a point corresponding to the location of the device in the track layout, a visual signal in said key, means for steadily lighting said signal in accordance with one condition of said device, means for maintaining said signal dark in accordance with another condition of said device, and means for periodically flashing said signal in accordance with a third condition of said device.

58. In a centralized traffic controlling system for railroads, a track layout including a railway track switch, a track diagram comprising a miniature representation of said track layout, a rotatable key for controlling said track switch located in said diagram at a corresponding position, means for enabling manual rotation of said key to be effected to simulate the different positions assumed by the track switch, circuit controlling means actuated by said key for controlling the track switch, a visual signal inclosed in said key, means controlled jointly by said key and by the track switch for steadily lighting said signal at times and for at other times maintaining said signal dark to indicate different conditions of the track switch, and means for periodically flashing said signal when the track switch responds to an operation of said key as long as the switch is in transit from its last operated position to a position corresponding to that of said key.

59. In an interlocking system for railroads; a track layout containing a plurality of routes, each route containing a plurality of track switches and track sections joining said switches; a signal for governing traffic over each of said routes; a plurality of route circuits, each including a wire for each of said sections and a contact controlled by each of said track switches for the corresponding route; switch control means for governing the operation of each of said switches; locking means for said switch control means; signal control means for each route; relay means controlled by said signal control means for each route for energizing the corresponding established route circuit; and means rendering said relay means for a particular route continuously responsive to the signal control means for that route only when said switches are continuously in correspondence with their respective switch control means and the locking means for the switches of said route are in position for preventing the operation of the associated switch control means.

60. In a centralized traffic controlling system, a control office and a remote location, a selector system over which distinctive control codes are transmitted from said office to said remote location, a track layout at said remote location including a plurality of track switches and track sections over which a plurality of routes are established, contacts for each switch indicating its position, a lock relay for each switch preventing the operation of the associated switch when deenergized, a route circuit for each of said routes including said contacts of the switches in the associated route and back contacts of the lock relays for each switch in said route, and means responsive to a distinctive code transmitted over said selector system for energizing said route circuit by current of a character depending on the direction in which traffic is to move over said route.

61. In combination, a location including a traffic route including a plurality of railway switches, a signal at each end of the route to govern traffic in opposite directions through the route, a remote controlled switch controlling relay for each position of each switch of the route to govern the operation of the respective switch, an operating circuit for each signal, a preliminary remote controlled signal controlling relay for each signal to prepare the operating circuit for the signal, a final signal controlling relay for each signal to complete the operating circuit for the signal, means including said preliminary remote controlled signal controlling relay for energizing said final signal controlling relays arranged to be closed only when each switch of the route is in correspondence with its remote controlled switch controlling relays and each switch of the route is locked, means controlled by the energization of each final signal control relay for energizing the associated signal operating circuit only when each switch of the route is in correspondence with its remote controlled switch controlling relays, and means controlled by combinations of coded impulses received from a remote location for selectively operating said remote controlled switch and signal controlling relays.

62. In a centralized traffic controlling system for railroads, a track section, a track switch associated with said section, a control lever, a control circuit distinctively energized in accordance with the position of said lever, switch control means responsive to the actuation of said lever for controlling the operation of said track switch, locking means responsive to specific conditions of said section for locking and unlocking said switch control means, a polar neutral relay included in said control circuit, and means including contacts of said polar neutral relay and contacts of said control lever for preventing operation of said switch control means subsequent to the restoration of said locking means to an unlocked condition if said control lever has been moved to a different position while said locking means was effective.

63. In combination, a railway track switch, a switch lever, means controlled by said switch lever when operated to its normal and reverse positions for operating said switch to normal and reverse positions respectively, an indication lamp, means controlled by said lever and by said switch for periodically lighting said lamp when said switch fails to correspond in position with said lever, locking means for at times locking the switch against operation controlled by a train adjacent said switch and by said signal control means, and means controlled by said locking means for steadily lighting said lamp to indicate the locked condition of said switch.

EARL M. ALLEN.
HOWARD A. THOMPSON.